(12) United States Patent
Ogilvie

(10) Patent No.: US 8,365,465 B2
(45) Date of Patent: Feb. 5, 2013

(54) COVERS FOR PLANT-GROWING MEDIA

(75) Inventor: James Barrie Ogilvie, Dundas (CA)

(73) Assignee: Enviro-Tex Products, Inc., Paris, Ontario (CA)

( * ) Notice: Subject to any disclaimer, the term of this patent is extended or adjusted under 35 U.S.C. 154(b) by 564 days.

(21) Appl. No.: 12/625,350

(22) Filed: Nov. 24, 2009

(65) Prior Publication Data
US 2011/0120000 A1 May 26, 2011

(51) Int. Cl.
*A01G 13/02* (2006.01)
(52) U.S. Cl. ............... 47/31.1; 206/423; 47/44; 47/47; 47/21.1; 47/66.6
(58) Field of Classification Search ............ 47/31.1, 47/21.1, 29.1, 29.2–29.4, 30, 32, 29.5, 65, 47/65.5, 66.7, 73–77, 79, 84, 44, 47, 66.6, 47/60, 61, 62 R, 63; 206/217, 562, 563, 206/423; 220/575, 556, 266, 709, 712, 367.1, 220/212; 229/407, 904
See application file for complete search history.

(56) References Cited

U.S. PATENT DOCUMENTS

| | | | | |
|---|---|---|---|---|
| D125,058 S * | 2/1941 | Ratner | ............... | D11/152 |
| 2,785,508 A * | 3/1957 | Coleman, Jr. | ............... | 47/70 |
| 3,102,364 A * | 9/1963 | Pullen | ............... | 47/74 |
| 3,961,443 A * | 6/1976 | Insalaco | ............... | 47/32 |
| 4,348,831 A * | 9/1982 | Chambers | ............... | 47/32 |
| D279,175 S * | 6/1985 | Eklof | ............... | D11/164 |
| 5,323,557 A * | 6/1994 | Sonntag | ............... | 47/32 |
| D352,893 S * | 11/1994 | Legacy et al. | ............... | D9/755 |
| 6,651,836 B1 * | 11/2003 | Hofheins et al. | ............... | 220/575 |
| 6,679,380 B2 * | 1/2004 | Brown | ............... | 206/427 |
| D490,309 S * | 5/2004 | Hayes et al. | ............... | D9/425 |
| 6,976,334 B1 * | 12/2005 | Bowditch | ............... | 47/32 |
| 7,617,631 B2 * | 11/2009 | Conrad et al. | ............... | 47/31.1 |
| 7,647,726 B2 * | 1/2010 | Gallo | ............... | 47/31.1 |
| D656,066 S * | 3/2012 | Ogilvie | ............... | D11/164 |
| 2010/0024294 A1 * | 2/2010 | Kertz | ............... | 47/29.1 |
| 2010/0212222 A1 * | 8/2010 | Gallo | ............... | 47/17 |

FOREIGN PATENT DOCUMENTS
GB 2313283 A 11/1997
* cited by examiner

*Primary Examiner* — Andrea Valenti
(74) *Attorney, Agent, or Firm* — Steven M. Greenberg, Esq.; Carey Rodriguez Greenberg O'Keefe, LLP

(57) ABSTRACT

A cover for a plant-growing medium comprises a main cover portion, a peripheral base spaced from the main cover portion and defining an outer perimeter of the cover, and a peripheral wall extending from a first side of the main cover portion between the main cover portion and the peripheral base. One or more plant growth channels are defined by one or more tubes extending from the first side of the main cover portion. Each tube has a proximal end adjacent the main cover portion and a distal end relative to the proximal end, with a first aperture defined in the main cover portion at the proximal end of the tube and a second aperture defined at the distal end of the tube. The first aperture and the second aperture communicate through the tube to define each plant growth channel.

16 Claims, 35 Drawing Sheets

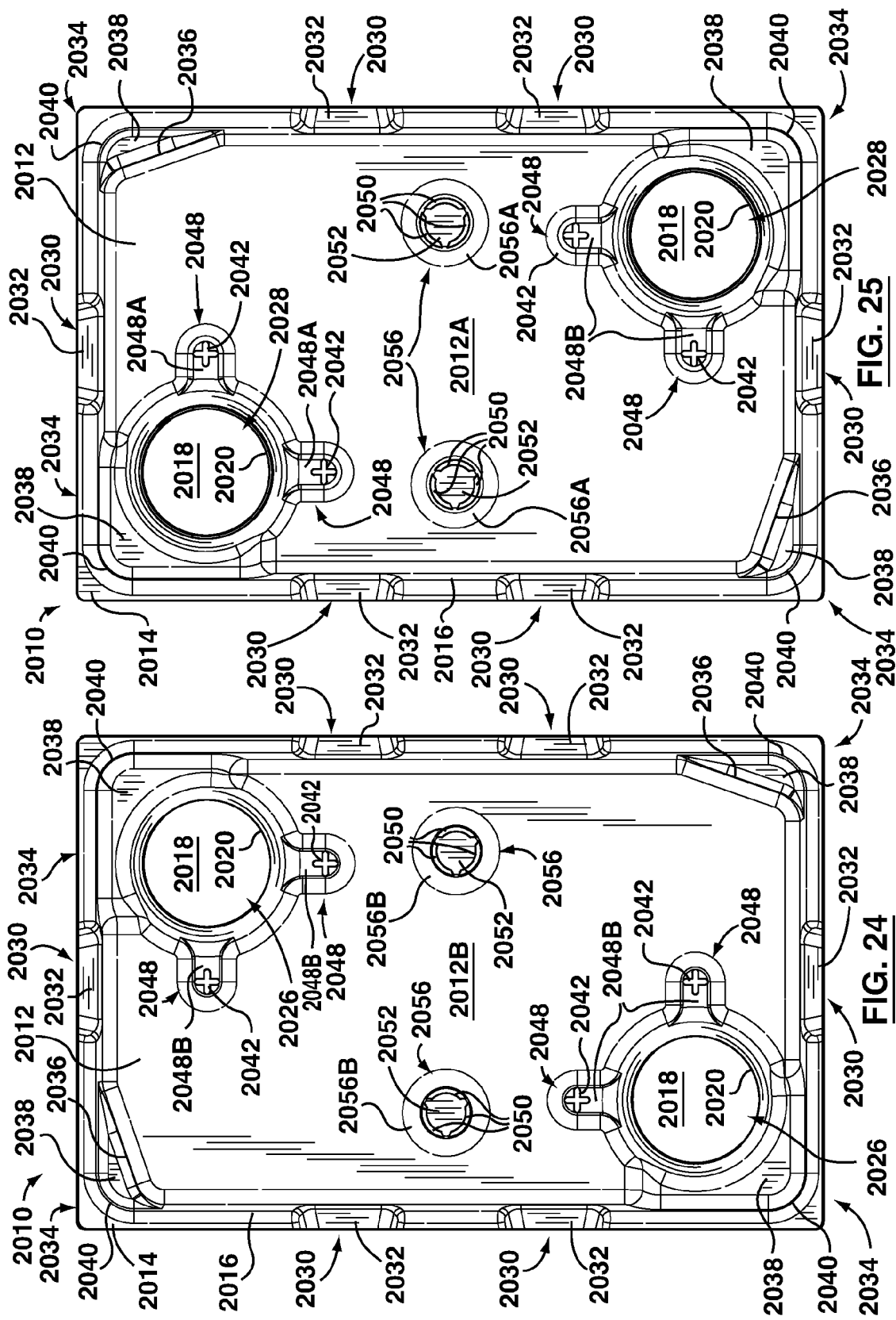

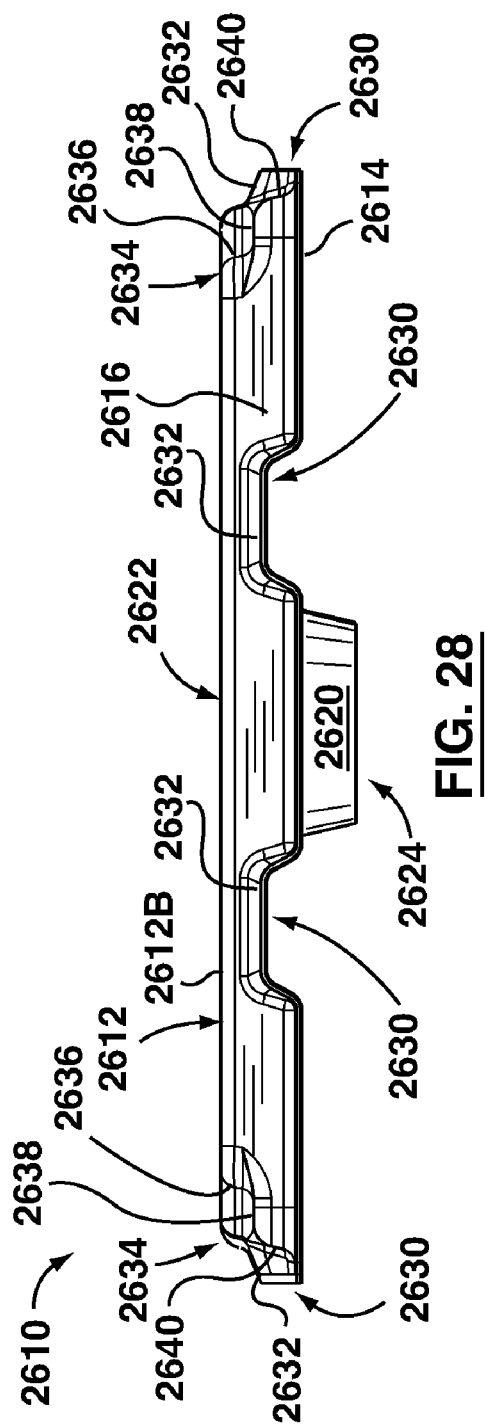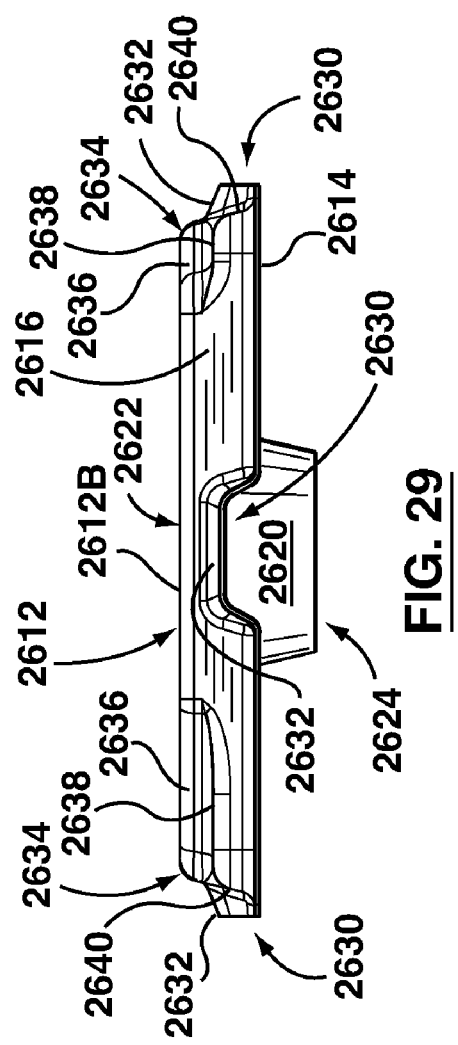

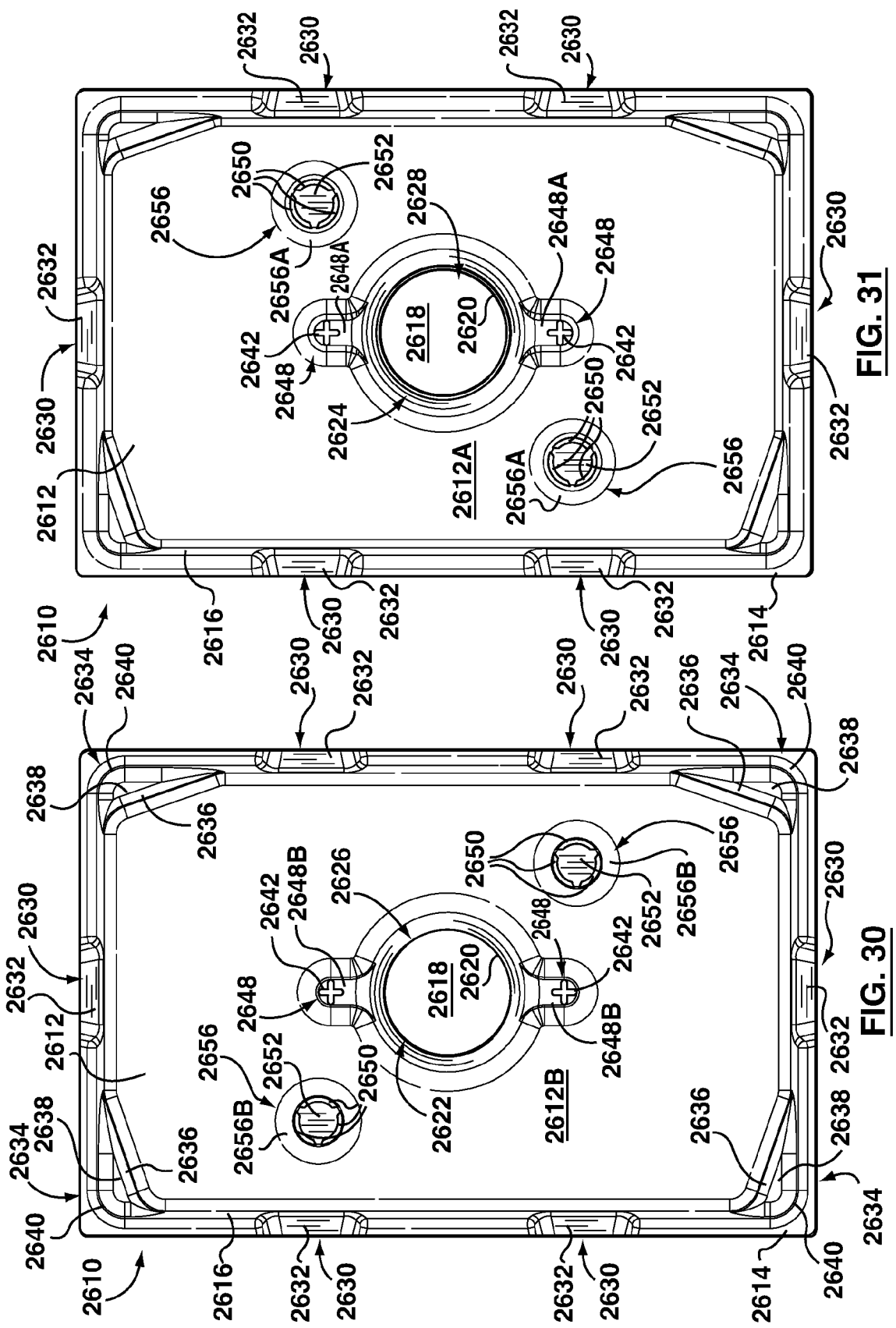

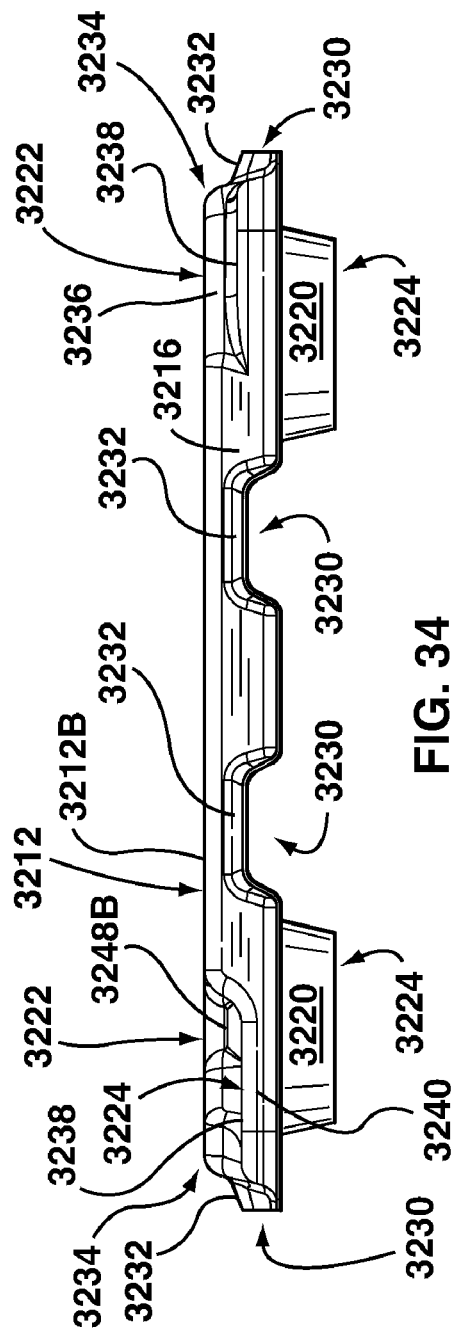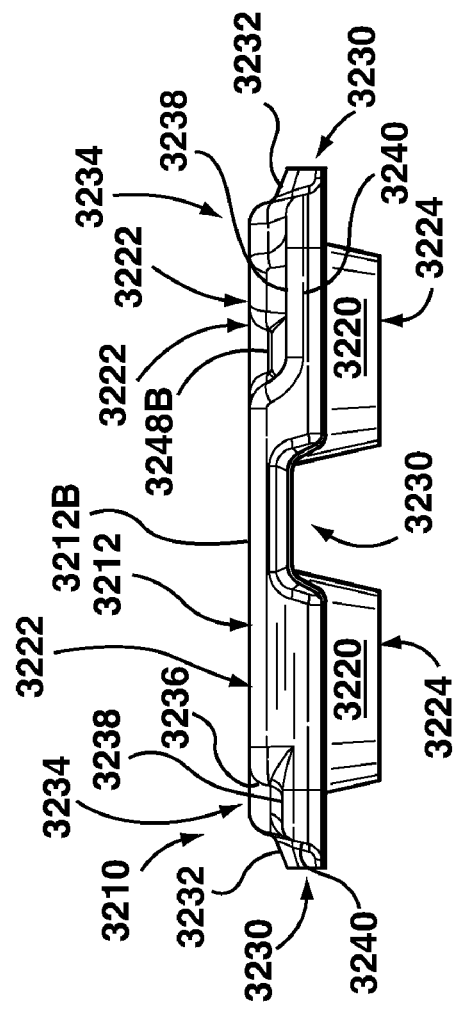

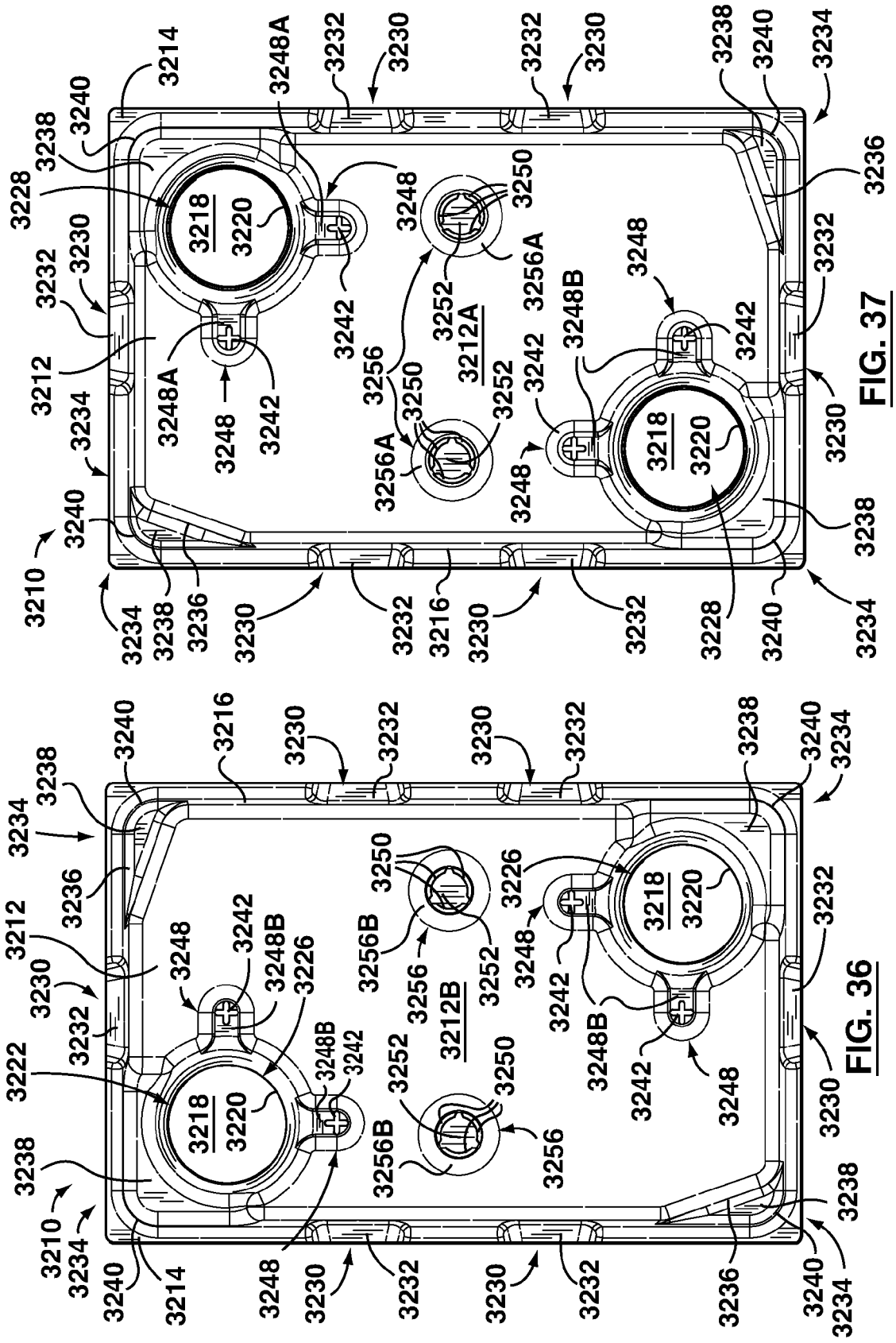

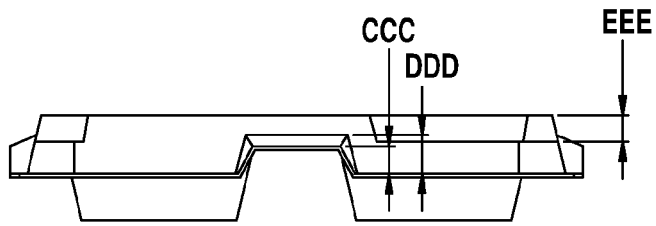
FIG. 43
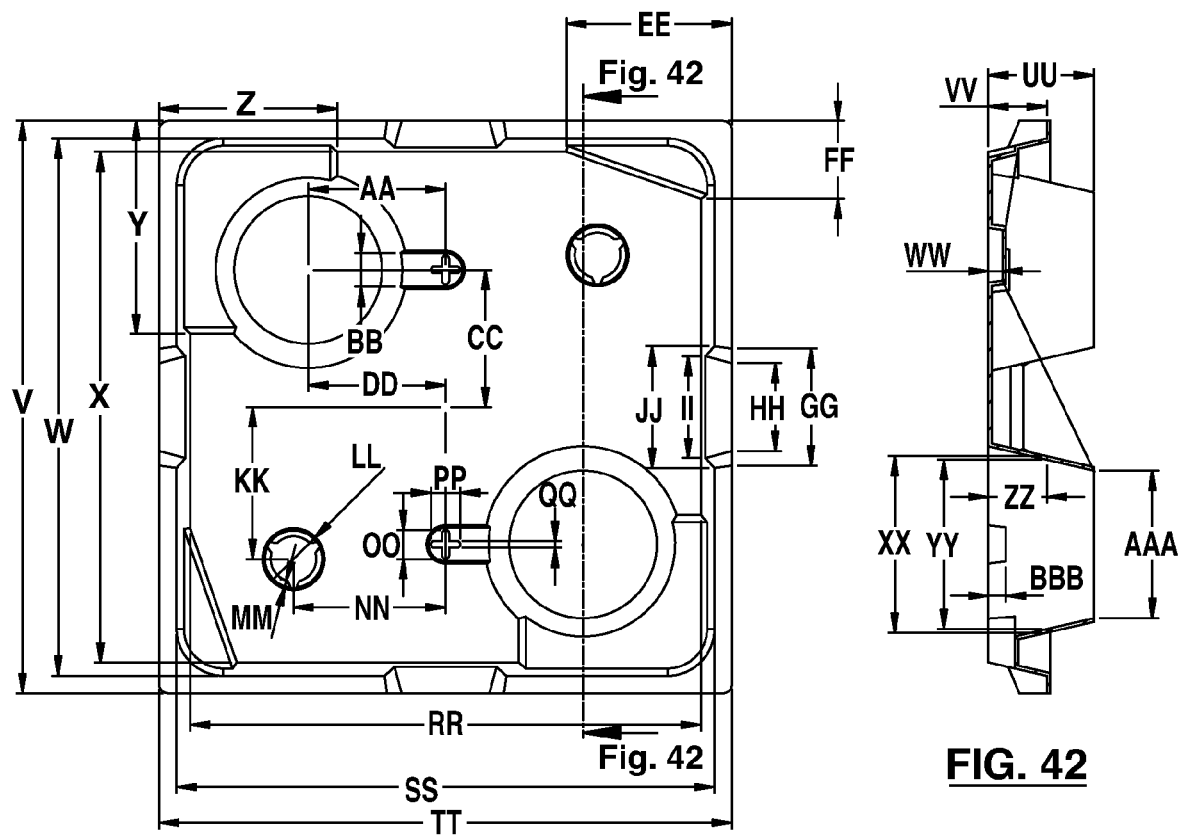
FIG. 41      FIG. 42

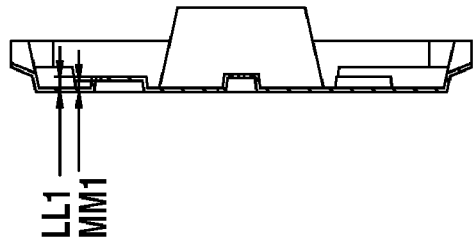
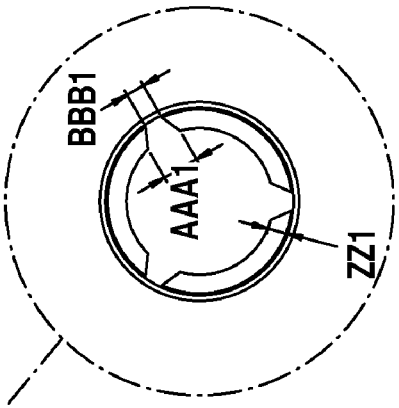
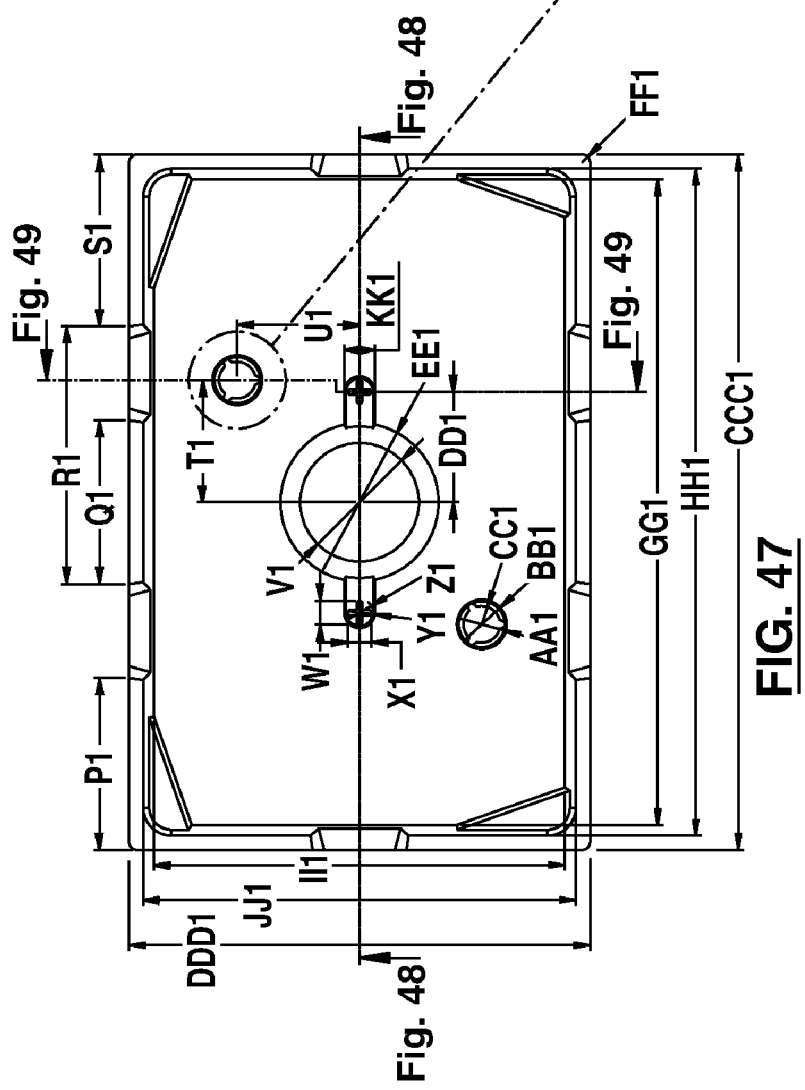
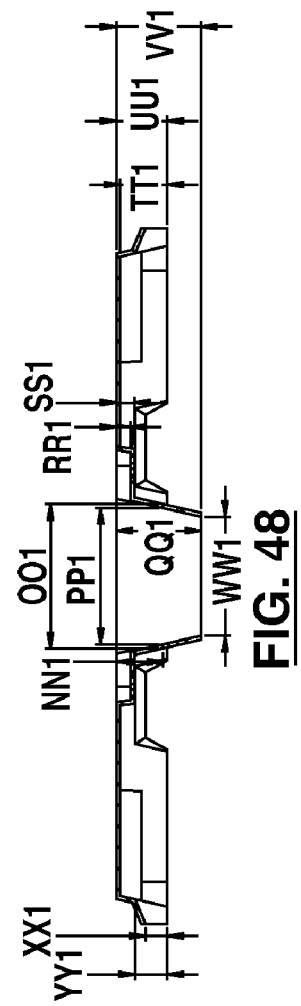
FIG. 47
FIG. 48
FIG. 49
FIG. 50

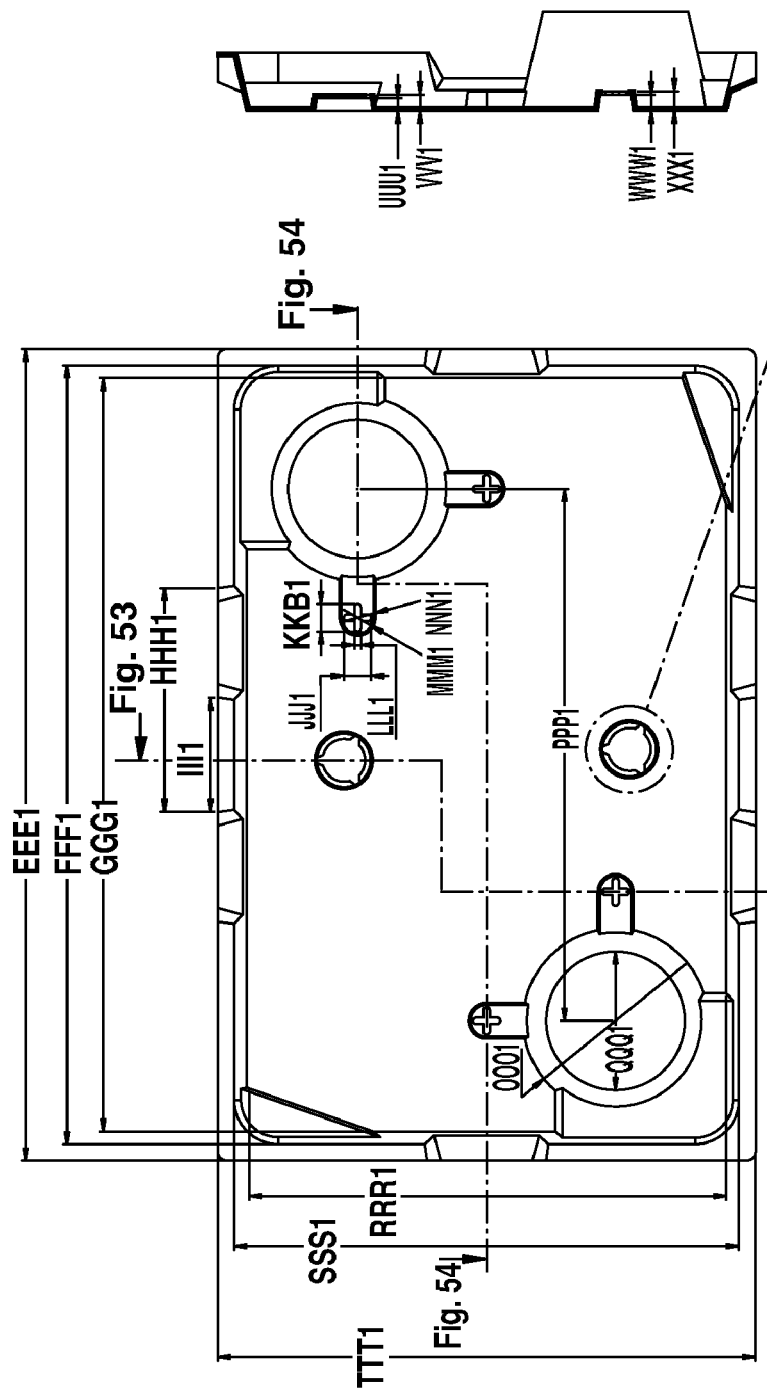
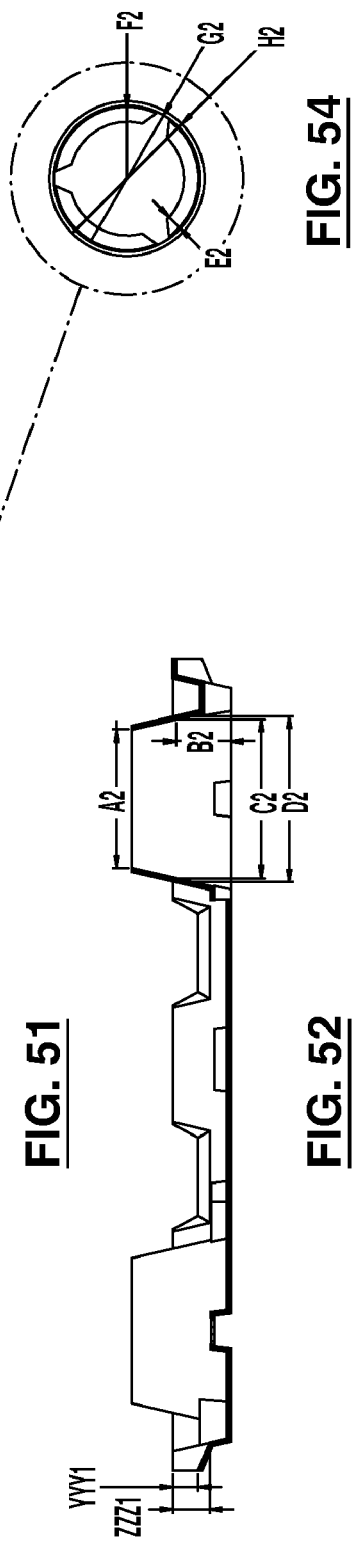
FIG. 51
FIG. 52
FIG. 53
FIG. 54

COVERS FOR PLANT-GROWING MEDIA

FIELD OF INVENTION

The present invention relates to plant cultivation, and more particularly to covers for use in plant cultivation.

BACKGROUND OF THE INVENTION

In the field of plant cultivation, plants are cultivated by preparing seedling plugs, and then using the seedling plugs to grow the plants.

Seedling plugs are prepared by planting rows of adjacent seeds in a plant-growing medium in a first growth area, and providing water and light until a plant which has grown from one of the seeds sprouts above the surface of the plant-growing medium. In order to conserve space, the seeds in the initial growth area are planted quite close to one another, so that if the seeds were permitted to continue growing past the initial sprouting stage within the initial growth area, their root structures would interfere with one another and their leaves would block light from reaching the leaves of adjacent plants.

Once the seeds have sprouted, seedling plugs are created by cutting a cylinder of plant-growing medium surrounding the root structure of each young plant. These seedling plugs are then moved to a second growth area and placed in discrete containers containing loose particulate plant-growing medium, or discrete blocks of rigid plant-growing medium such as rockwool, to allow the plants to grow to sufficient maturity for sale. Once the seedling plugs have been removed from the first growth area, a new set of seeds is planted therein, so that this new set of seeds can sprout while the plants from the previous set of seeds mature, so that plants at various levels of maturity are growing simultaneously. Optionally, the seedlings may be grown to an intermediate level of maturity in the second growth area and then transferred to a third growth area where the containers are spaced further from one another and allowed to further mature. Automated mechanical handling of the discrete containers, and of the discrete blocks of rigid plant-growing medium such as rockwool, is quite common.

SUMMARY OF THE INVENTION

In one aspect, the present invention is directed to a cover for a plant-growing medium. The cover comprises a main cover portion, a peripheral base spaced from the main cover portion and defining an outer perimeter of the cover, a peripheral wall extending from a first side of the main cover portion between the main cover portion and the peripheral base, and at least one plant growth channel. Each plant growth channel is defined by a tube extending from the first side of the main cover portion and having a proximal end adjacent the main cover portion and a distal end relative to the proximal end. A first aperture is defined in the main cover portion at the proximal end of the tube and a second aperture is defined at the distal end of the tube, with the first aperture and the second aperture communicating through the tube.

In one embodiment, the main cover portion is generally planar. Preferably, for each plant growth channel, the tube extends past the peripheral base. In each plant growth channel, the first aperture may be larger than the second aperture and the tube may be generally frusto-conical and taper from the first aperture to the second aperture. The peripheral base may comprise an outwardly extending peripheral flange located at a distal end of the peripheral wall, relative to the main cover portion, and the outermost edge of the peripheral flange may define a notional rectangle. In such an embodiment, for each edge of the notional rectangle defined by the outermost edge of the peripheral flange, at least one arch-shaped indentation is defined in a distal portion of the peripheral wall that is distal from the main cover portion. The peripheral wall may also include recess regions where a proximal portion of the peripheral wall adjacent the main cover portion is recessed inwardly to define an intermediate shoulder between the proximal portion of the peripheral wall and the distal portion of the peripheral wall. These recess regions may be located adjacent corners of the notional rectangle defined by the outermost edge of the peripheral flange.

In one embodiment, the main cover portion has at least one receiving slot defined therethrough adjacent each plant growth channel, each receiving slot able to receive a plant support member and retain the plant support member so that the plant support member extends from the second side of the main cover portion, generally perpendicularly thereto. The receiving slot or slots may be cruciform, and each receiving slot may be located in a plant support area of the main cover portion defined by a plant support projection on the first side of the main cover portion and a corresponding plant support depression on the second side of the main cover portion.

In one embodiment, the main cover portion has at least one set of perforations therethrough, each set of perforations defining a removable tab, whereby removal of the tab defines an irrigation aperture for receiving an irrigation tube. Each set of perforations may be located in an irrigation area of the main cover portion defined by an irrigation projection on the first side of the main cover portion and a corresponding irrigation depression on the second side of the main cover portion.

In one embodiment, the cover is integrally formed, and may be formed from biodegradable material, such as bagasse.

BRIEF DESCRIPTION OF THE DRAWINGS

These and other features of the invention will become more apparent from the following description in which reference is made to the appended drawings wherein:

FIG. 24 is a top plan view of the cover of FIG. 20;

FIG. 25 is a bottom plan view of the cover of FIG. 20;

FIG. 28 is a first side view of the cover of FIG. 26;

FIG. 29 is a second side view of the cover of FIG. 26;

FIG. 30 is a top plan view of the cover of FIG. 26;

FIG. 31 is a bottom plan view of the cover of FIG. 26;

FIG. 34 is a first side view of the cover of FIG. 32;

FIG. 35 is a second side view of the cover of FIG. 32;

FIG. 36 is a top plan view of the cover of FIG. 32;

FIG. 37 is a bottom plan view of the cover of FIG. 32;

FIGS. 41 to 43 are dimension drawings for an exemplary embodiment of the cover of FIG. 14;

FIGS. 47 to 50 are dimension drawings for an exemplary embodiment of the cover of FIG. 26; and FIGS. 51 to 54 are dimension drawings for an exemplary embodiment of the cover of FIG. 32.

DETAILED DESCRIPTION

Figure 1:
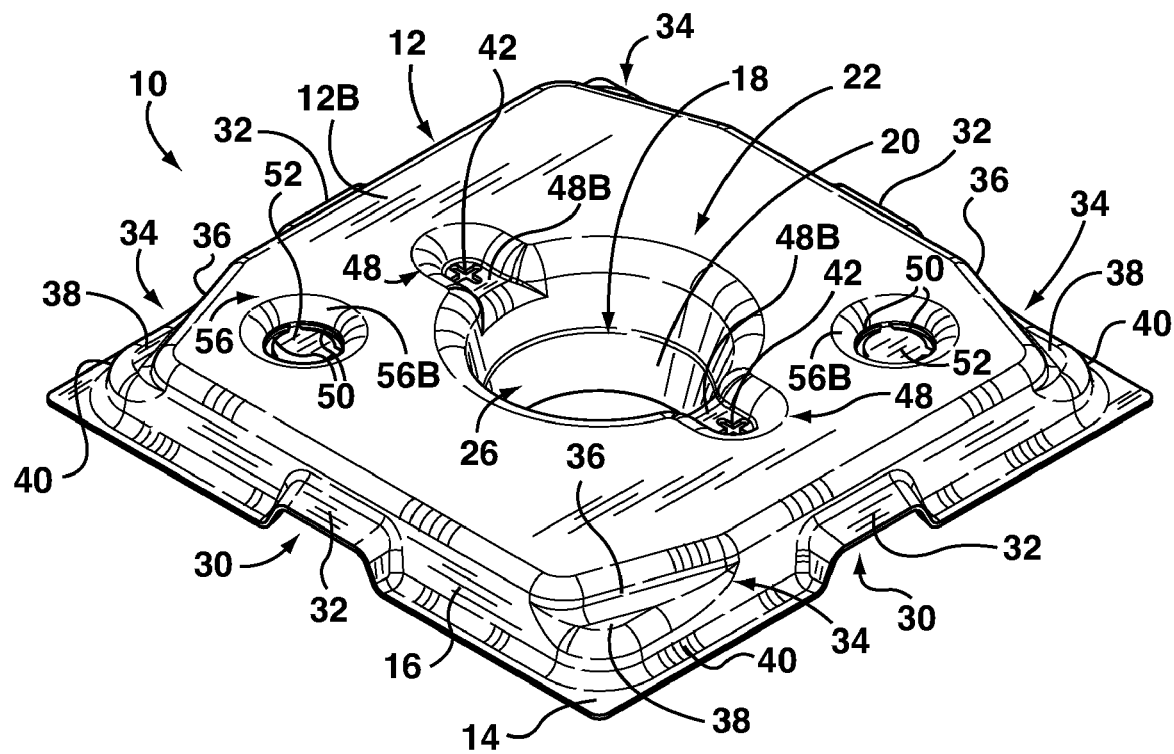
FIG. 1 is a top perspective view of a first embodiment of a cover for a plant-growing medium.
Figure 2:
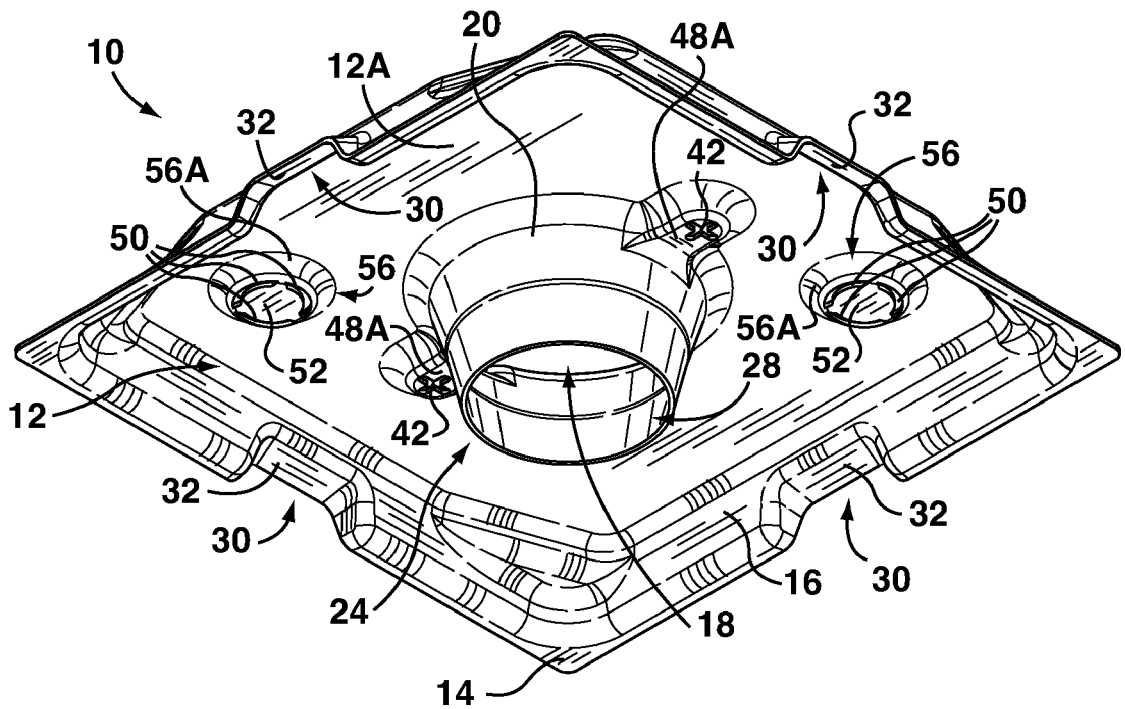
FIG. 2 is a bottom perspective view of the cover of FIG. 1.
Figure 3:
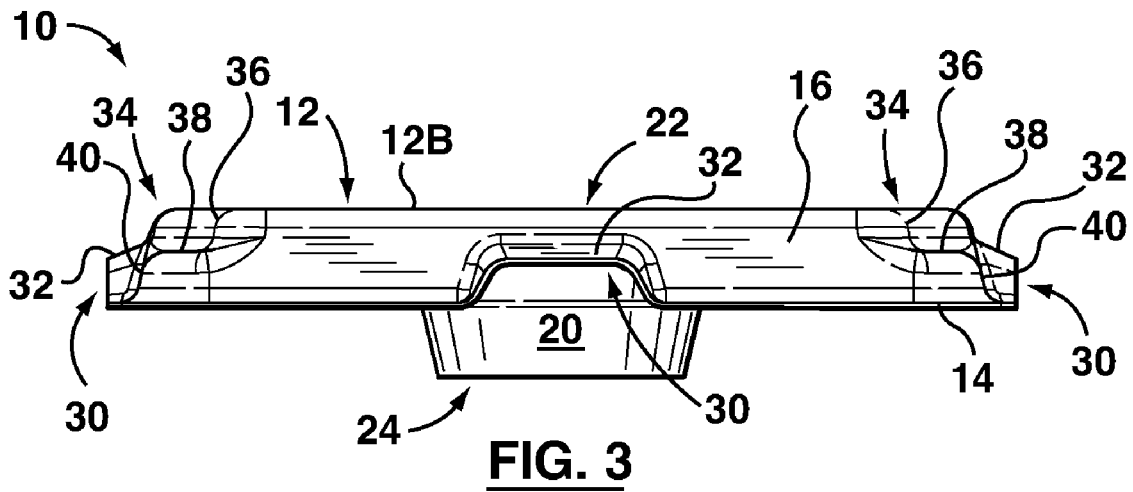
FIG. 3 is a first side view of the cover of FIG. 1.
Figure 4:
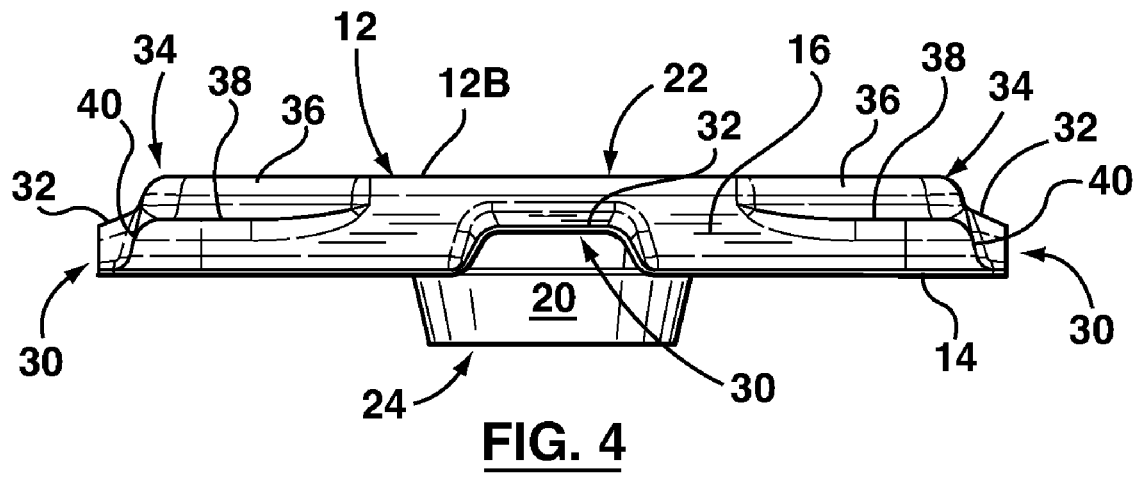
FIG. 4 is a second side view of the cover of FIG. 1.

Reference is now made to FIGS. 1 to 6, in which a first exemplary embodiment of a cover for a plant-growing medium is shown generally at 10. The cover 10 comprises a generally planar main cover portion 12, a peripheral base 14 and a peripheral wall 16. The peripheral base 14 is spaced from the main cover portion 12 and defines the outer perimeter of the cover 10. In a preferred embodiment, the peripheral base 14 extends further outwardly than the main cover portion 12. The peripheral wall 16 extends from a first side 12A of the main cover portion 12, between the main cover portion 12 and the peripheral base 16. In the illustrated embodiment, the peripheral base 14 comprises an outwardly extending peripheral flange located at a distal end of the peripheral wall 16, relative to the main cover portion 12.

A plant growth channel 18 in the cover 10 is defined by a tube 20 extending from the first side 12A of the main cover portion 12. The tube 20, and hence the plant growth channel 18, is positioned in the center of the main cover portion 12. The tube 20 has a proximal end 22 adjacent the main cover portion 12 and a distal end 24, relative to the proximal end 22. A first aperture 26 is defined in the main cover portion 12 at the proximal end 22 of the tube 20, and a second aperture 28 is defined at the distal end 24 of the tube 20. The first and second apertures 26, 28 communicate with one another through the tube 20 to define the plant growth channel 18.

In the embodiment shown in FIGS. 1 to 6, the tube 20 extends past the peripheral base 14, so that the distal end 24 of the tube 20 is further away from the main cover portion 12 than the peripheral base 14. As such, when the cover 10 is positioned over top of a growing medium, as shown in FIGS. 10A through 13C, the distal end 24 of the tube 20 can penetrate into the plant-growing medium. In a preferred embodiment, the first aperture 26 is larger than the second aperture 28, and the tube 20 is generally frusto-conical and tapers from the proximal end 22 to the distal end 24

Figure 5:
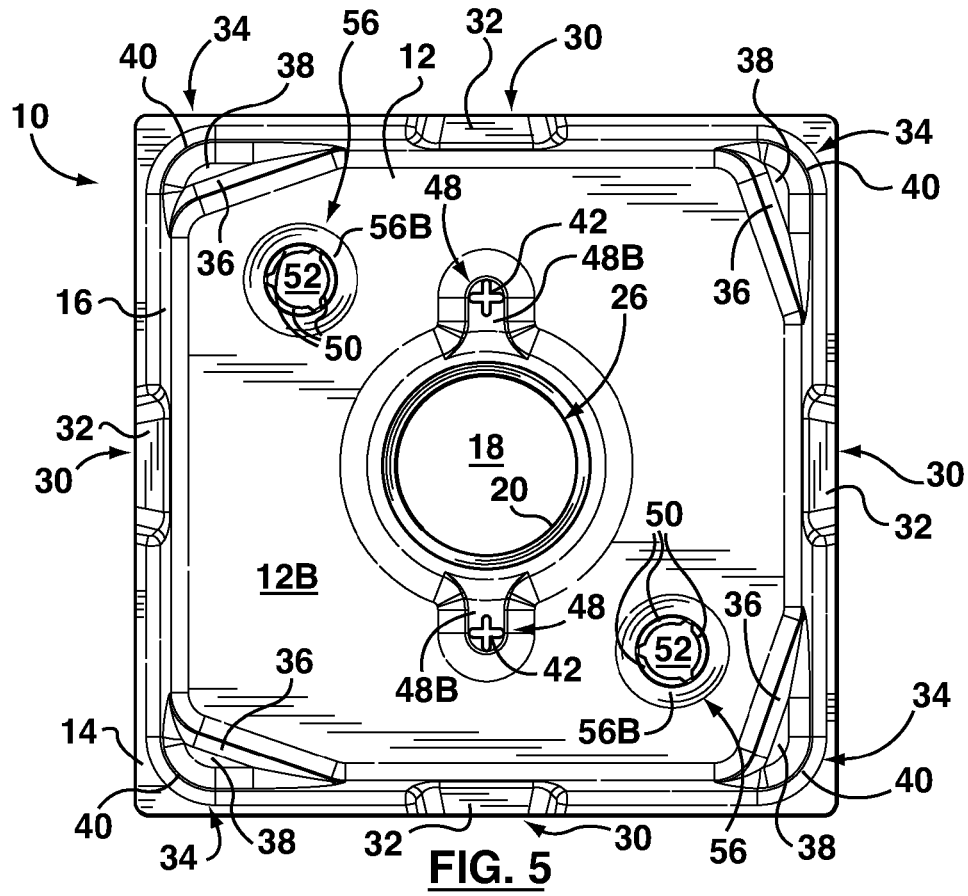
FIG. 5 is a top plan view of the cover of FIG. 1.
Figure 6:
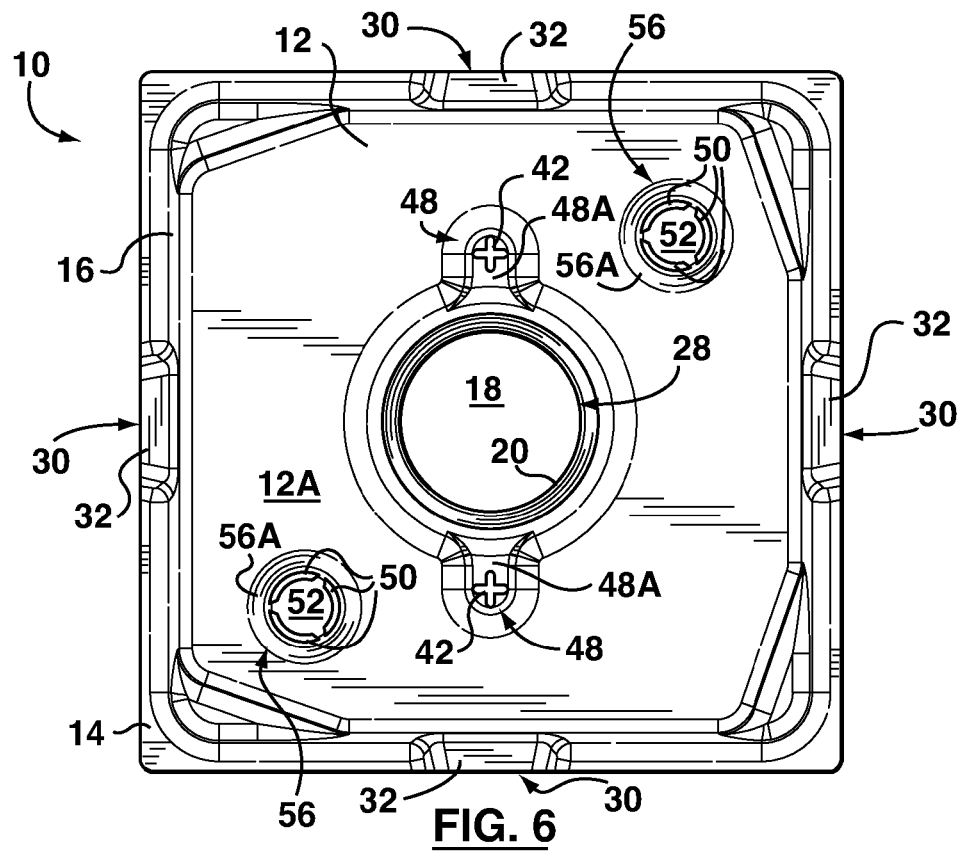
FIG. 6 is a bottom plan view of the cover of FIG. 1.

As best seen in FIGS. 5 and 6, in the first exemplary cover 10 the outermost edge of the peripheral flange that forms the peripheral base 14 defines a notional rectangle, more particularly a notional square. The sides defining the outermost edge of the peripheral flange that forms the peripheral base 14 need not be perfectly linear, and may have curved corners as shown, as well as indentations and the like, while still defining a notional rectangle. Preferably, arch-shaped indentations are defined in the peripheral wall 16. In the first exemplary cover 10, on each edge of the notional rectangle defined by the outermost edge of the peripheral flange forming the peripheral base 14, an arch-shaped indentation 30 is defined in a distal portion 40 of the peripheral wall 16, that is, the portion of the peripheral wall 16 that is distal from the main cover portion 12. As can be seen, the arch-shaped indentations 30 are defined in the peripheral wall 16, and preferably do not interrupt the peripheral flange forming the peripheral base 14; rather, a portion 32 of the peripheral flange follows the perimeter of the arch-shaped indentations 30. This arrangement facilitates trimming during the manufacturing process.

In addition, in the illustrated embodiment of the first exemplary cover 10, the peripheral wall 16 includes recess regions 34 where a proximal portion 36 of the peripheral wall 16 adjacent the main cover portion 12 is recessed inwardly to define an intermediate shoulder 38 between the proximal portion 36 of the peripheral wall 16 and the distal portion 40 of the peripheral wall. In a preferred embodiment, the recess regions 34 are located adjacent corners of the notional rectangle defined by the outermost edge of the peripheral flange forming the peripheral base 14. When a plurality of covers 10 are stacked on top of the other in a nested configuration, the recess regions 34 serve as de-stacking lugs, inhibiting the covers 10 from nesting so closely as to create a friction fit that would inhibit separation of one cover from another cover. For greater clarity, the proximal portion 36 and distal portion 40 of the peripheral wall 16 is labeled at each recess region 34.

The main cover portion 12 has two opposed receiving slots 42 defined therethrough adjacent each plant growth channel 18. In the first exemplary cover 10, the receiving slots 42 are cruciform, and are able to receive a plant support member 44, such as a dowel of suitable diameter (see FIGS. 10C and 11C), and retain the plant support member 44 so that the plant support member extends from the second side 12B of the main cover portion 12, generally perpendicularly thereto. Each receiving slot 42 is located in a plant support area 48 of the main cover portion 12, with each plant support area 48 being defined by a plant support projection 48A on the first side 12A of the main cover portion 12 and a corresponding plant support depression 48B on the second side 12B of the main cover portion 12. As shown in FIGS. 10C, 11C, 12C and 13C, when plant support members 44 are installed in the receiving slots 42, a plant 44 which is growing through the plant growth channel 18 can be secured (e.g. by tying) to the plant support members 44 to facilitate upright growth. While the first exemplary cover 10 has two receiving slots 42 associated with the plant growth channel 18, in other embodiments only a single receiving slot, or more than two receiving slots, may be associated with a plant growth channel.

The main cover portion 12 also has two sets of perforations 50 therethrough, with each set of perforations 50 defining a removable tab 52. Removing the tab 52 creates an irrigation aperture in the main cover portion 12 for receiving an irrigation tube. For example, an irrigation tube 54 (see FIGS. 10A to 13C) can be pressed downward against one of the tabs 52 from the second side 12B of the main cover portion 12, separating the tab 52 from the main cover portion 12 as the irrigation tube 54 passes through the newly created irrigation aperture and enters the plant-growing medium. Each set of perforations 50 and tab 52 is located in an irrigation area 56 of the main cover portion 12, with the irrigation areas 56 defined by an irrigation projection 56A on the first side 12A of the main cover portion 12 and a corresponding irrigation depression 56B on the second side 12B of the main cover portion 12.

Figure 7:
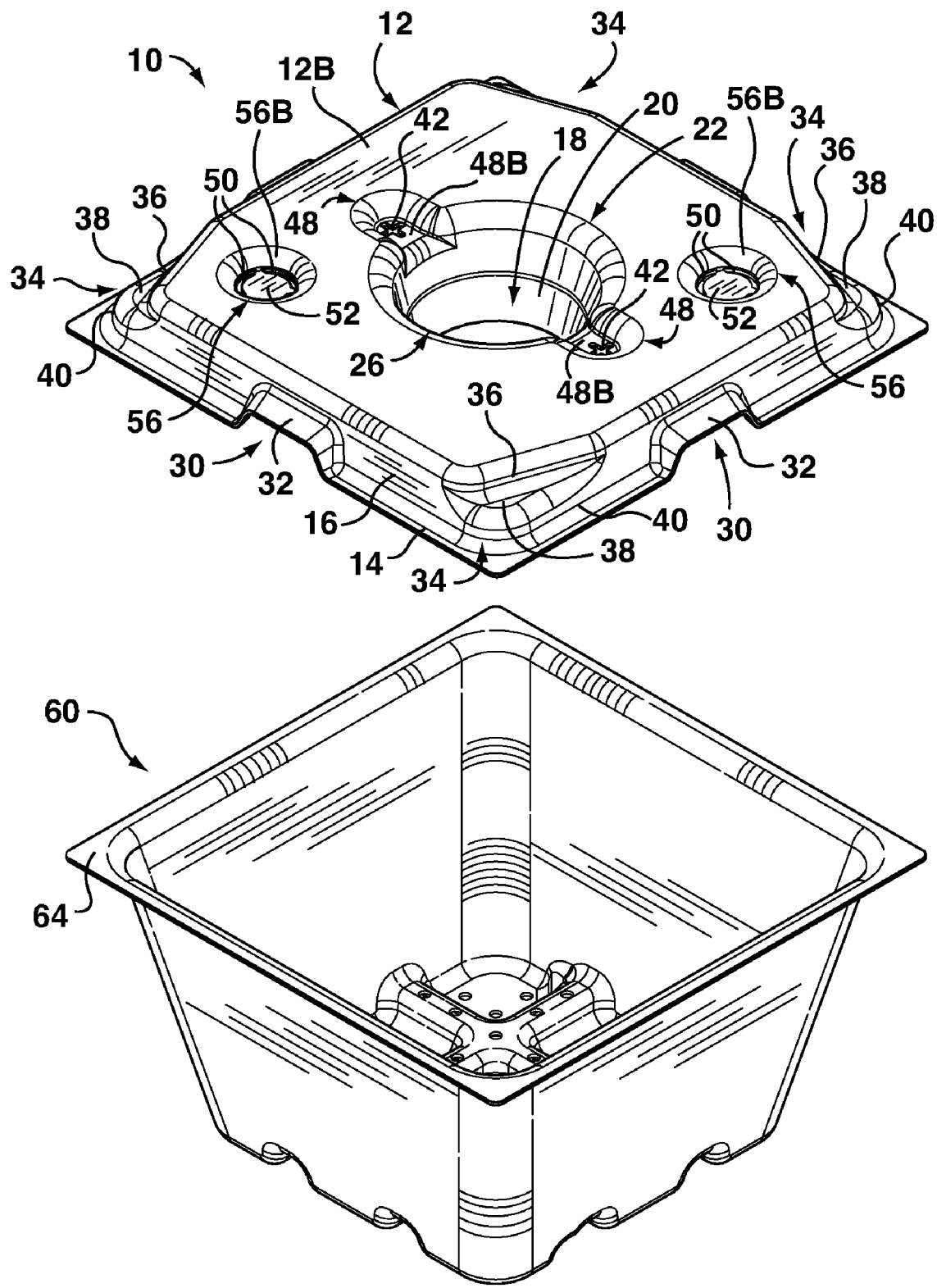
FIG. 7 is an exploded perspective view of the cover of FIG. 1 and a mating container.
Figure 8:
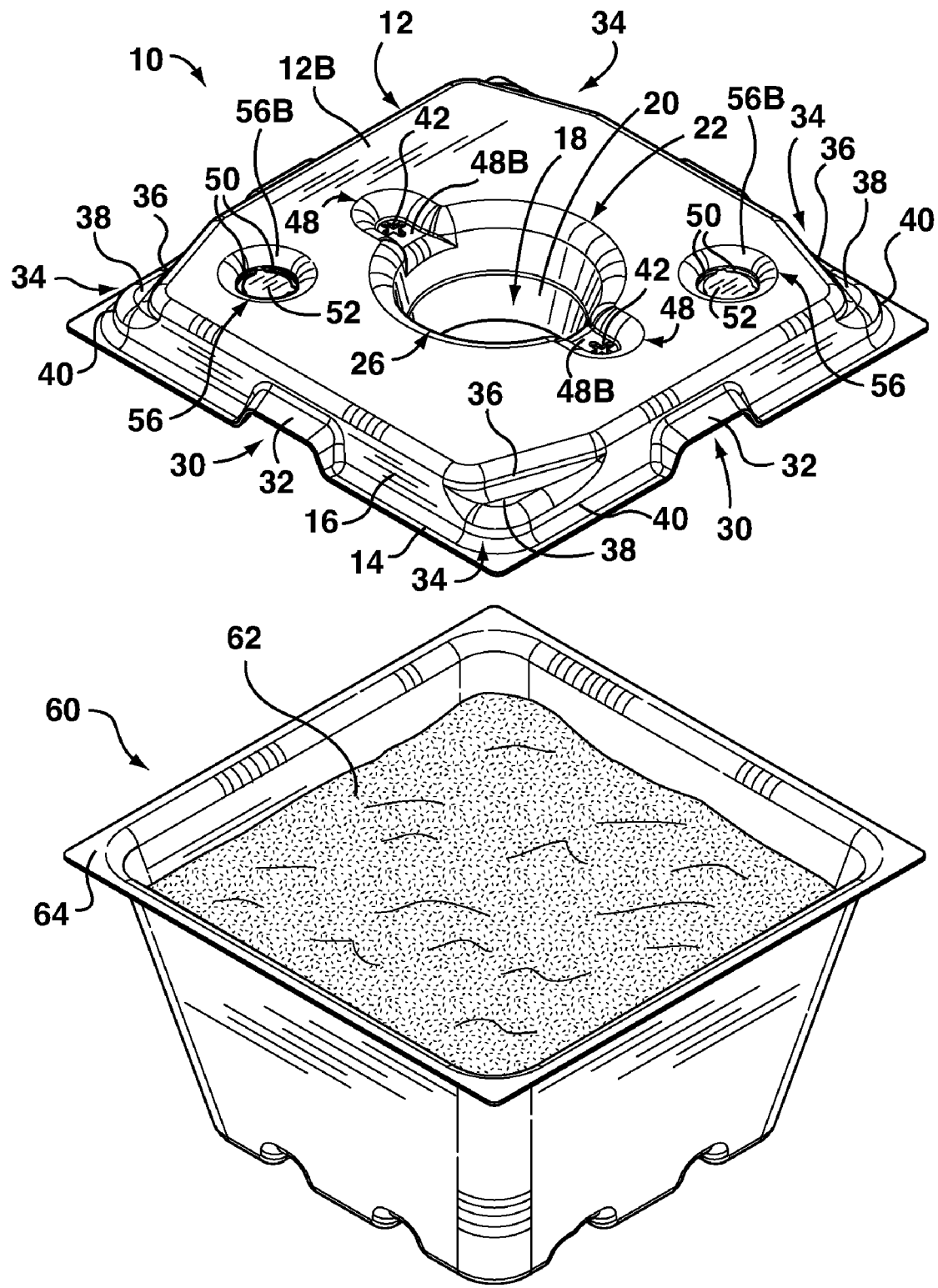
FIG. 8 is an exploded perspective view of the cover of FIG. 1 and the container of FIG. 7, with a plant-growing medium disposed inside the container.
Figure 9:
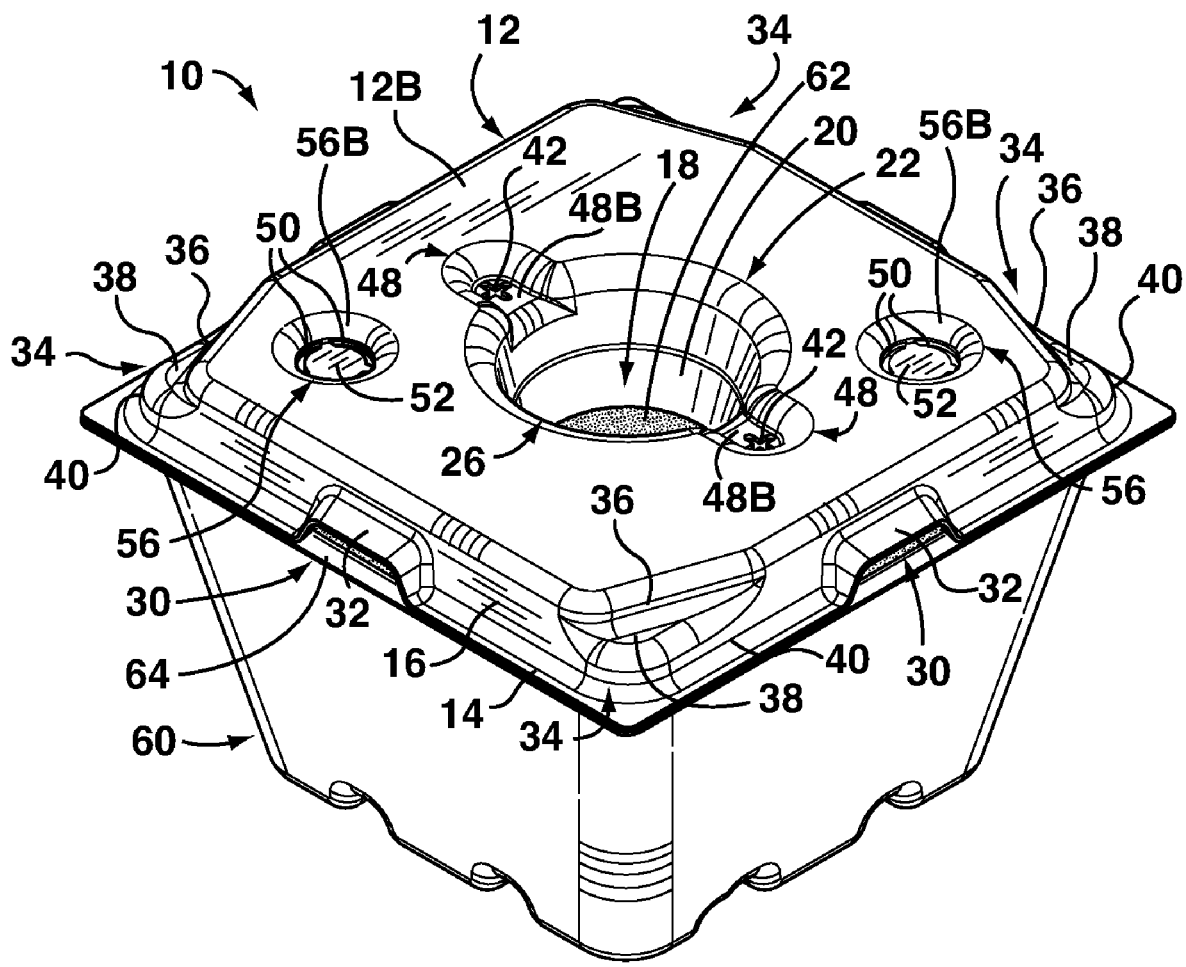
FIG. 9 is a perspective view showing the cover of FIG. 1 secured to the container of FIG. 7.

Referring now to FIGS. 7 to 9, a container with which the first exemplary cover 10 may be used is shown generally at 60. As shown in FIG. 8, the container 60 may be filled with a suitable plant-growing medium 62, such as shredded coconut husk, so that a seedling plug may be installed therein. The container 60 has a peripheral flange 64 corresponding in size and shape to the peripheral flange forming the peripheral base 14 of the exemplary first exemplary cover 10. Thus, the peripheral base 14 of the first exemplary cover 10 mates with the peripheral flange 64 of the container 60, so that the first exemplary cover 10 can be secured to the container 60, for example by way of adhesive between the peripheral base of the first exemplary cover 10 and the peripheral flange 64 of the container 60, to form a complete, self-contained unit, as shown in FIG. 9. Accordingly, that the container 60 mates with the first exemplary cover 10.

Reference is now made to FIGS. 10A to 10C and 11A to 11C. For simplicity and ease of illustration, not all reference numerals from FIGS. 1 to 9 are marked in FIGS. 10A to 10C and 11A to 11C.

Figure 10A:
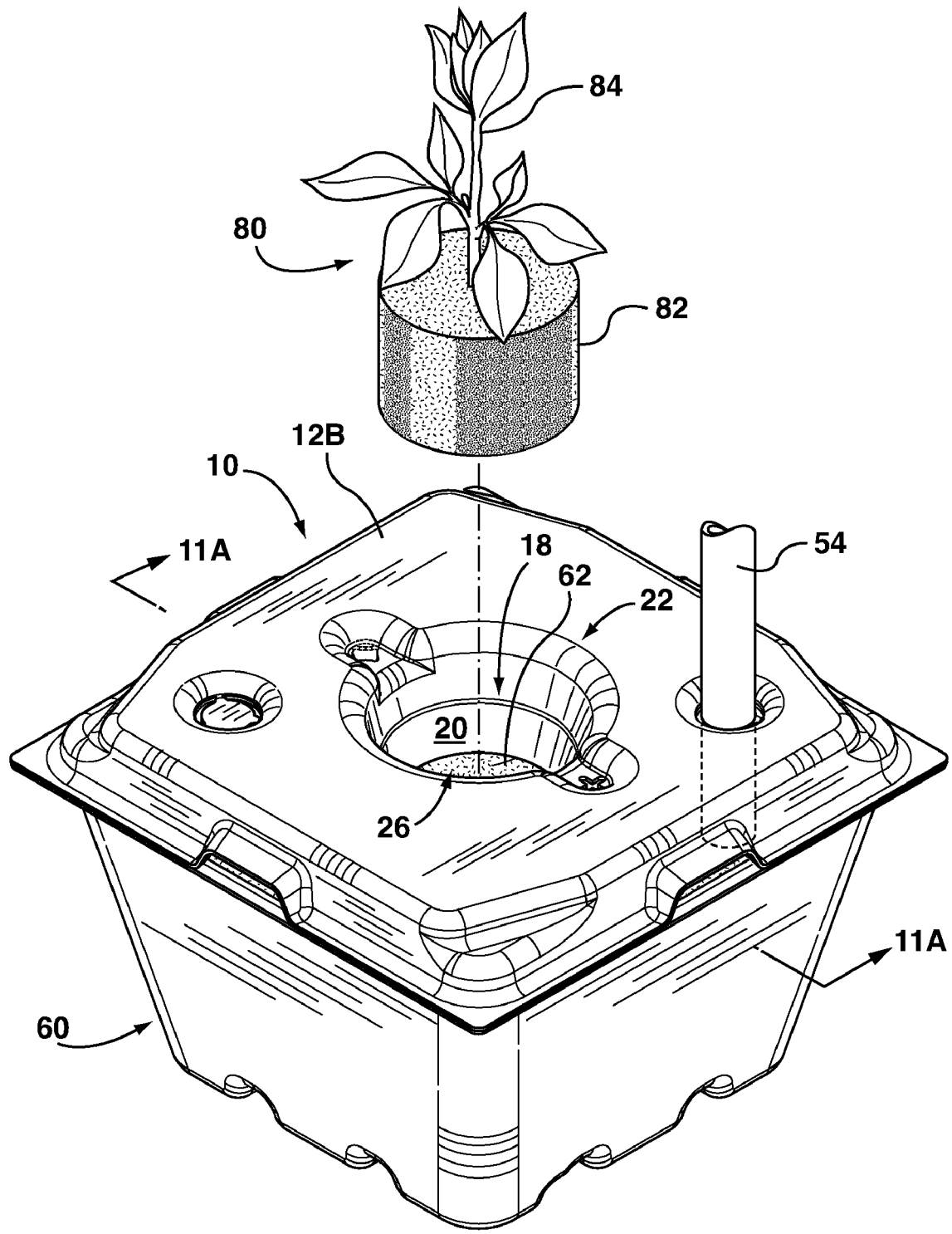
FIG. 10A is a perspective view showing a seedling plug with a plant being inserted through the cover of FIG. 1 into the container of FIG. 7.
Figure 11A:
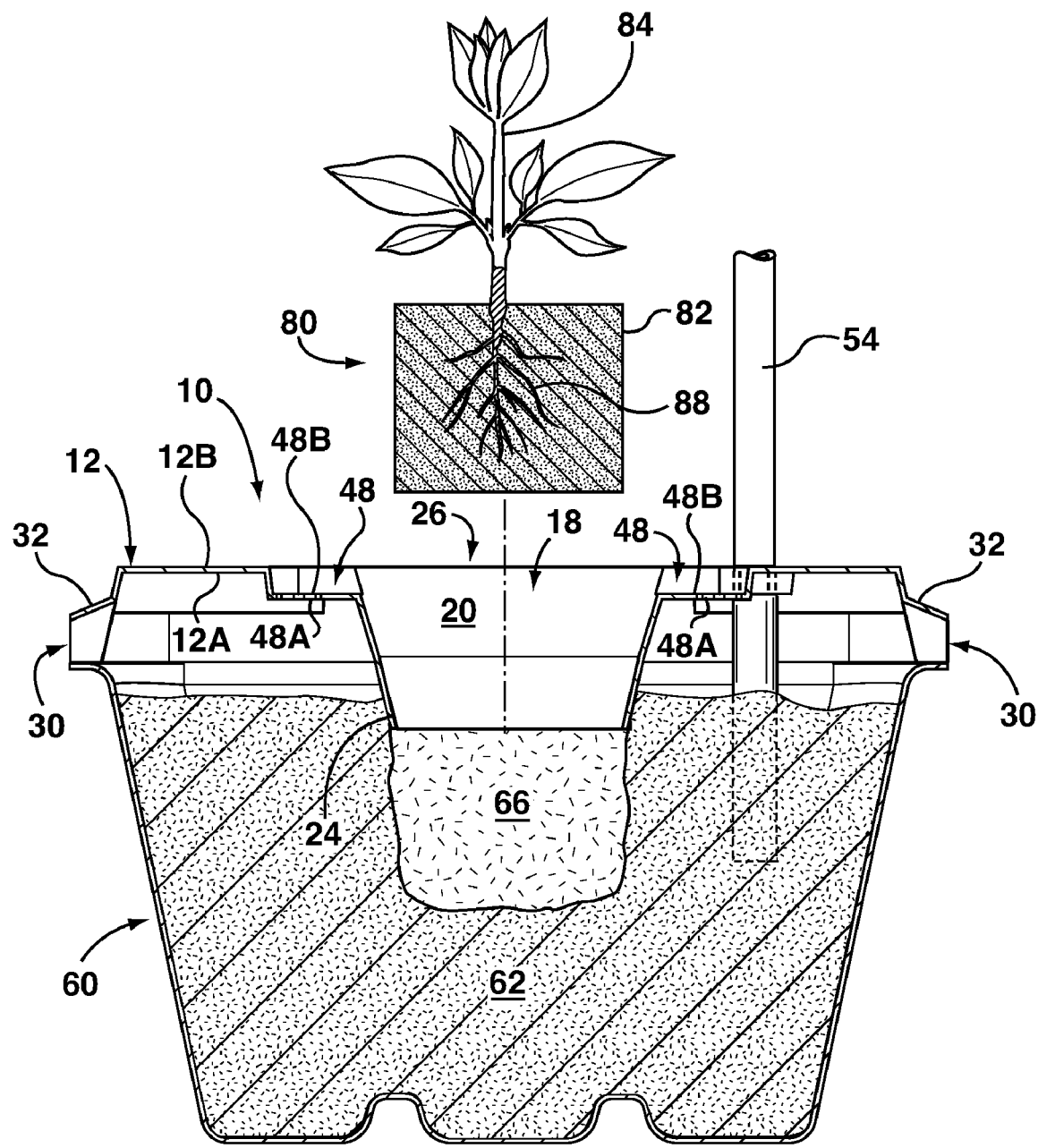
FIG. 11A is a side cross-sectional view, taken along the line 11A-11A in FIG. 10A, showing the seedling plug of FIG. 10A being inserted through the cover of FIG. 1 into the container of FIG. 7.

In FIGS. 10A and 11A, a seedling plug 80, comprising a cylinder of plant-growing medium 82 and a young seedling plant 84, is positioned above a container 60 filled with plant-growing medium 62 and with first exemplary cover 10 secured thereover. As best seen in FIG. 11A, a cavity 66 has been impressed into the plant-growing medium 62 in the container 60. Also shown in FIG. 11A, the root structure 88 of the seedling plant 84 is contained within the cylinder of plant-growing medium 82. An irrigation tube 54 passes through the irrigation aperture formed by separating the tab 52 from the main cover portion 12.

Figure 11B:
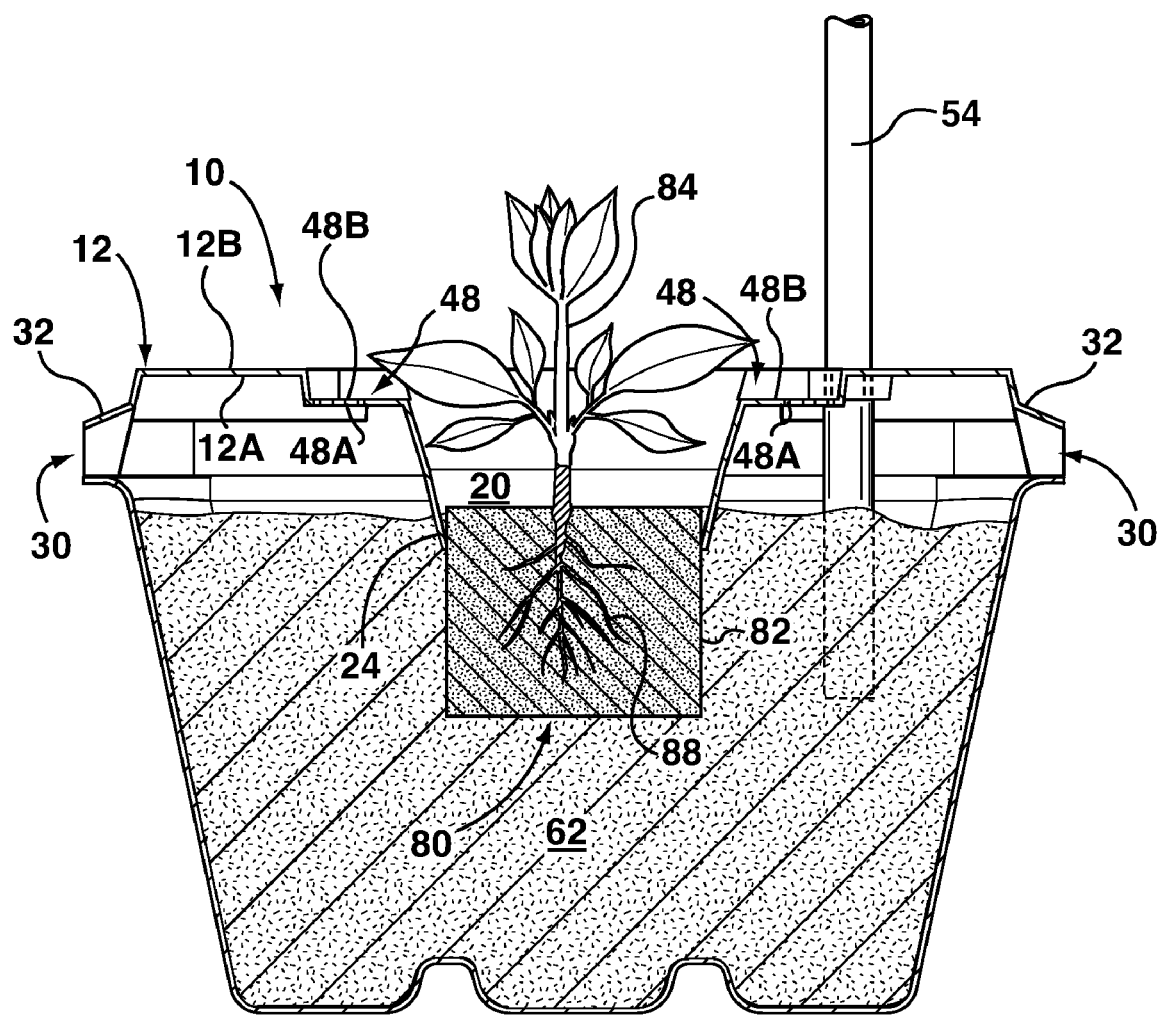
FIG. 11B is a is a side cross-sectional view, taken along the line 11B-11B in FIG. 10B, showing the seedling plug of FIG. 10A disposed in the container of FIG. 7, with the plant of FIG. 10A at a first stage of growth and extending through the cover of FIG. 1.

The seedling plug 80 is moved downwardly through the first aperture 26 at the proximal end 22 of the tube 20, so that the cylinder of plant-growing medium 82 passes through the tube 20 and into the cavity 66, as shown in FIG. 11B. As can be seen in FIG. 11A, the diameter of the distal end 24 of the tube 20 is slightly smaller than the diameter of the cylinder of plant-growing medium 82, so that the distal end 24 of the tube 20 is sandwiched between the cylinder of plant-growing medium 82 and the plant-growing medium 62 in the container 60 when the cylinder of plant-growing medium 82 is received in the cavity 66.

Figure 10B:
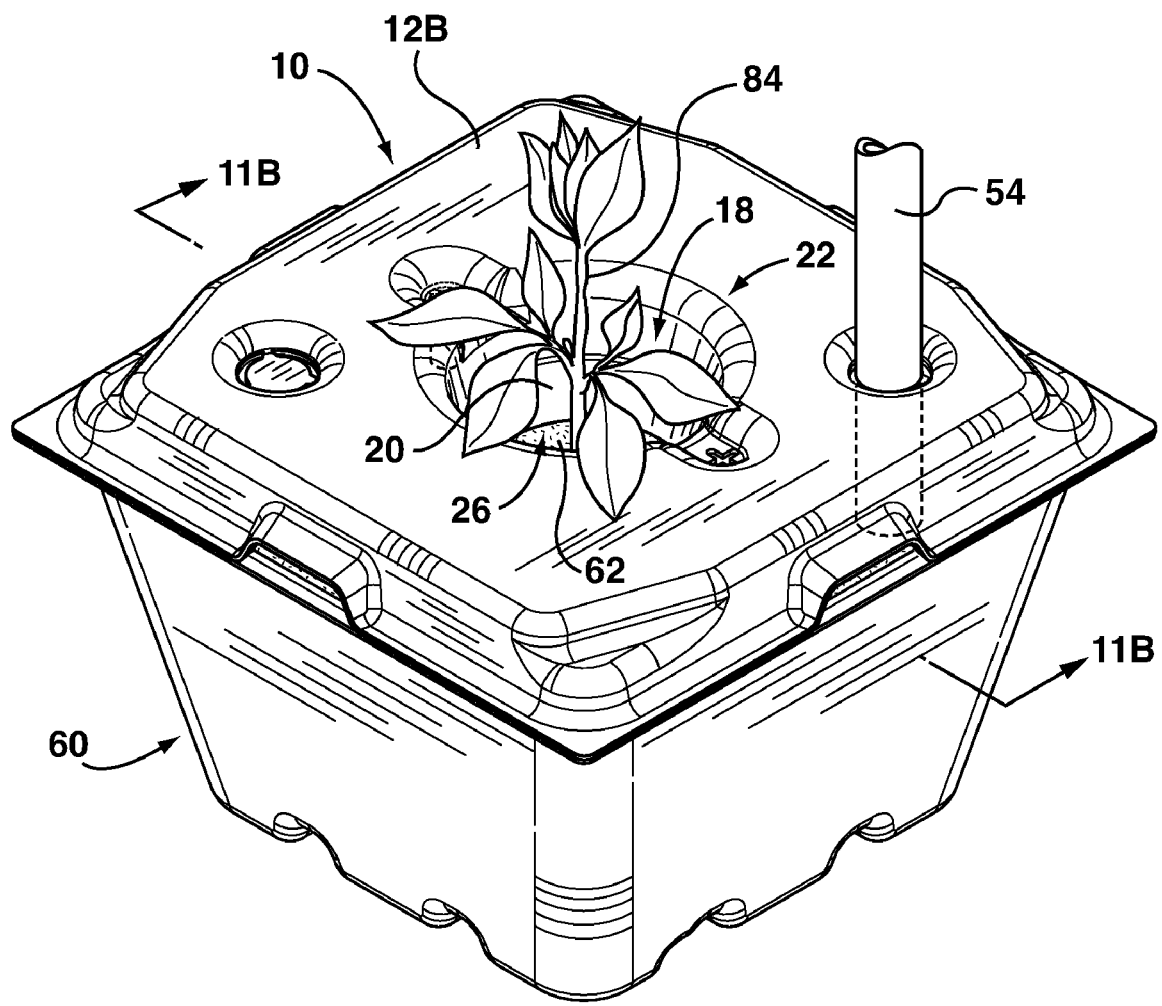
FIG. 10B is a perspective view showing the seedling plug of FIG. 10A disposed in the container of FIG. 7, with the plant of FIG. 10A at a first stage of growth and extending through the cover of FIG. 1.
Figure 10C:
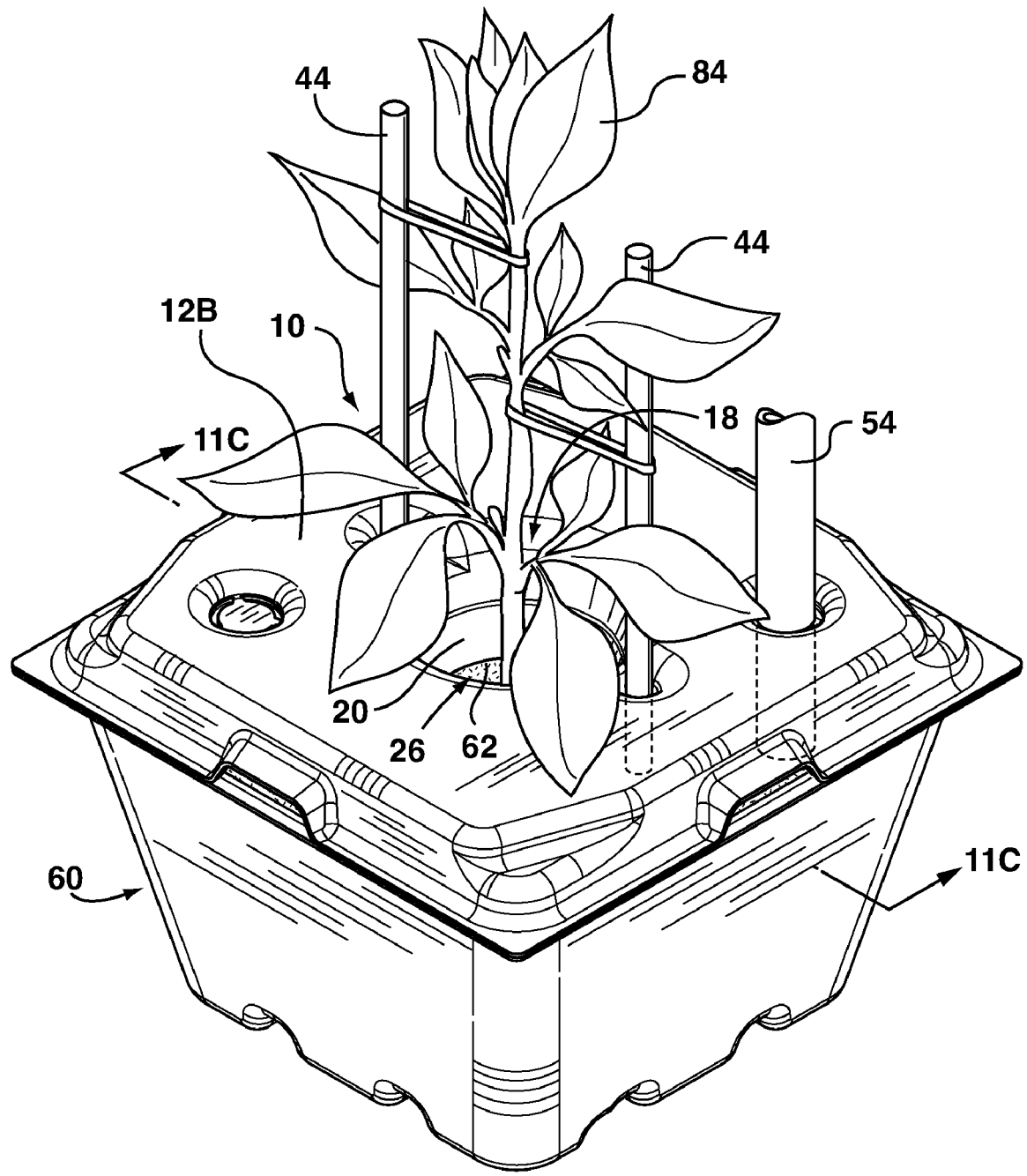
FIG. 10C is a perspective view showing the seedling plug of FIG. 10A disposed in the container of FIG. 7, with the plant of FIG. 10A at a second stage of growth and extending through the cover of FIG. 1.
Figure 11C:
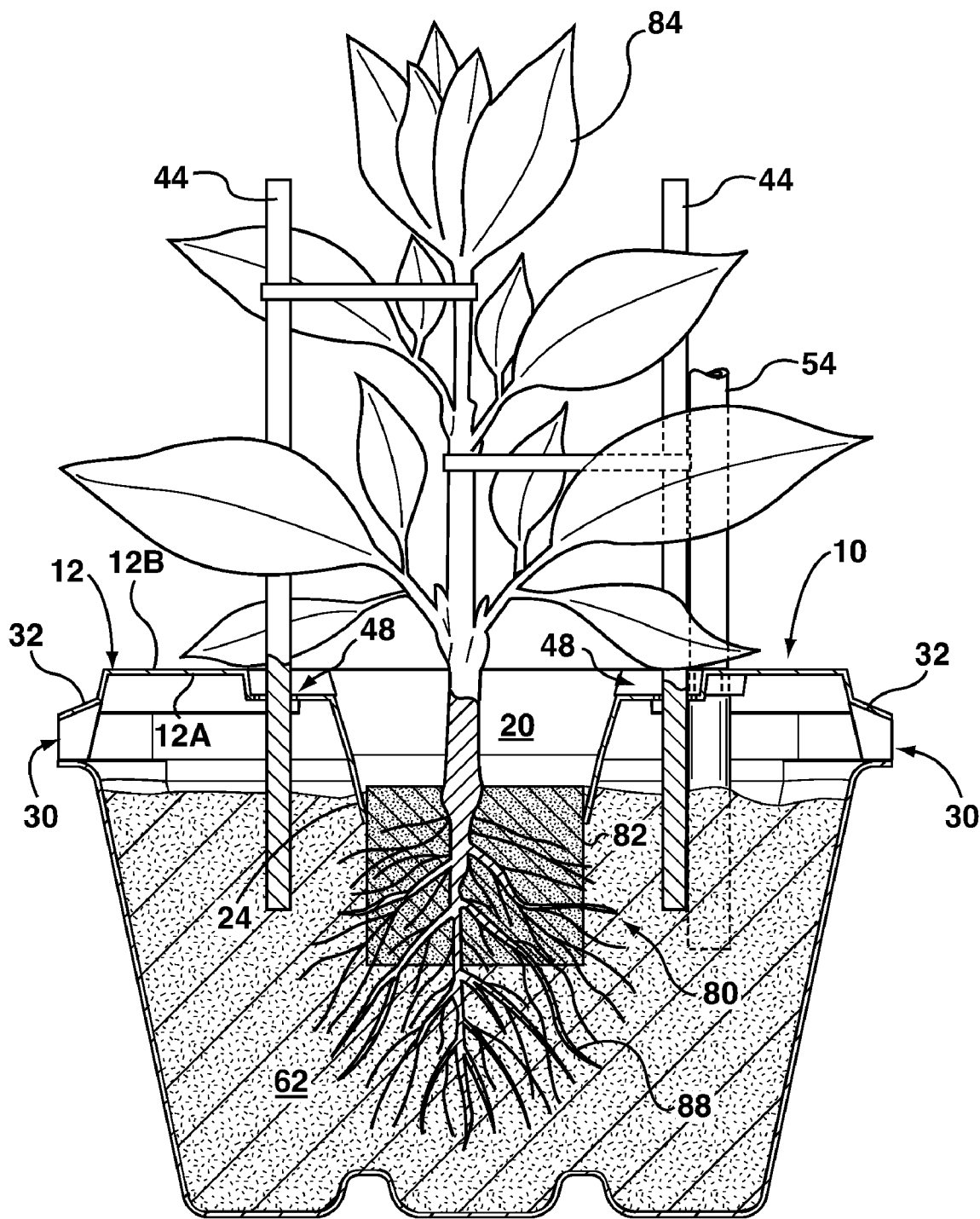
FIG. 11C is a is a side cross-sectional view, taken along the line 11C-11C in FIG. 10C, showing the seedling plug of FIG. 10A disposed in the container of FIG. 7, with the plant of FIG. 10A at a second stage of growth and extending through the cover of FIG. 1.

Once the seedling plug 80 has been installed in the assembly comprising the container 60, first exemplary cover 10 and plant-growing medium 62, as shown in FIGS. 10B and 11B, the seedling plant 84 can continue to grow, as shown in FIGS. 10C and 11C, and the root structure 88 of the seedling plant 84 can extend beyond the cylinder of plant-growing medium 82 and into the surrounding plant-growing medium 62, as shown in FIG. 11C. In addition, as the seedling plant 84 grows larger, plant support members 44 can be inserted into the cruciform receiving slots 42 to support the seedling plant 84 in an upright posture as it grows, as shown in FIGS. 10C and 11C.

Referring now to FIGS. 12A to 12C and 13A to 13C, use of one of the covers 10 with a formed block 90 of rockwool 92 is illustrated. As with the discussion of FIGS. 10A to 10C and 11A to 11C, not all reference numerals from FIGS. 1 to 9 are marked in FIGS. 12A to 12C and 13A to 13C.

Figure 12A:
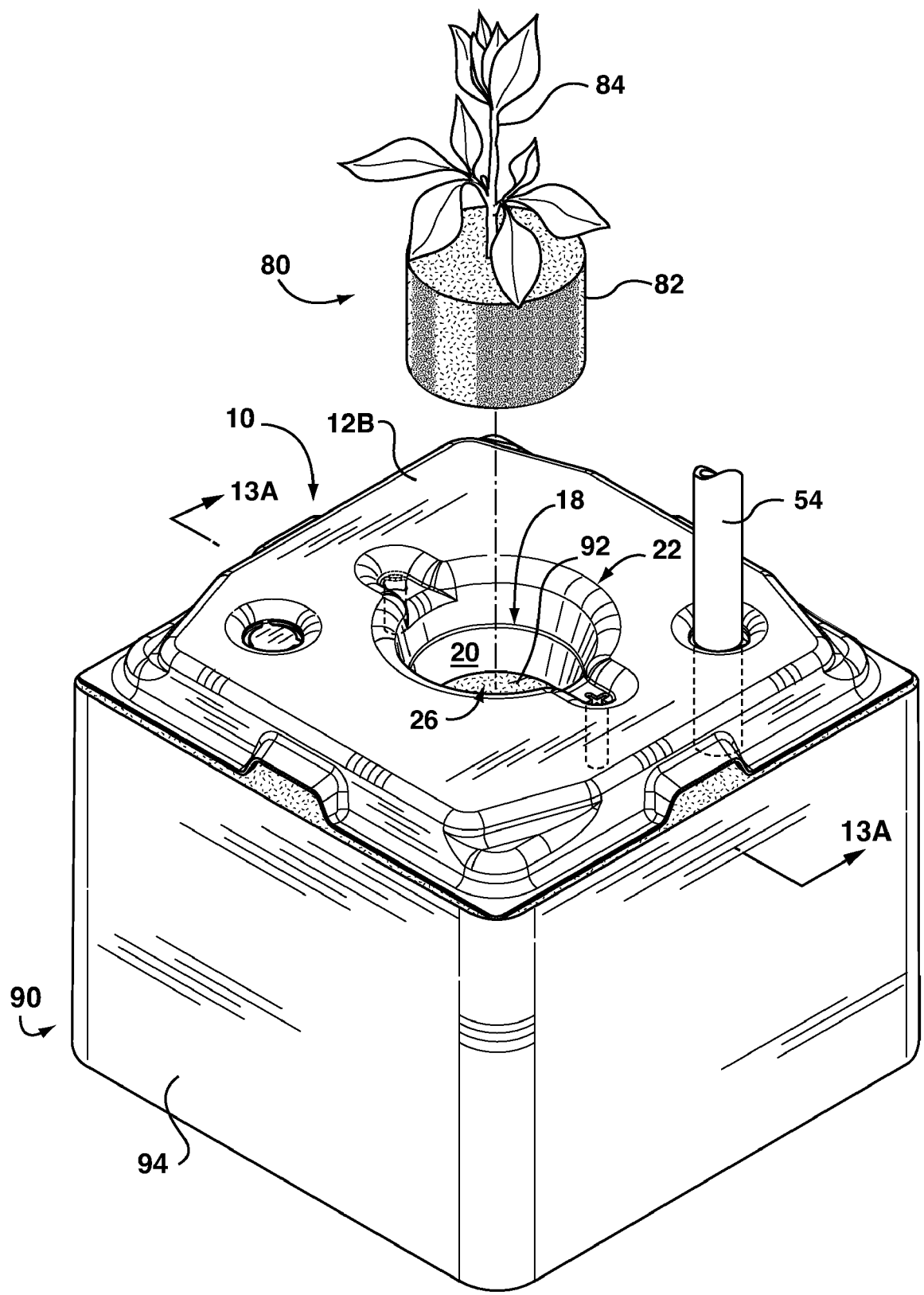
FIG. 12A is a perspective view showing the seedling plug of FIG. 10A being inserted through the cover of FIG. 1 into a rigid block of plant-growing medium.
Figure 12B:
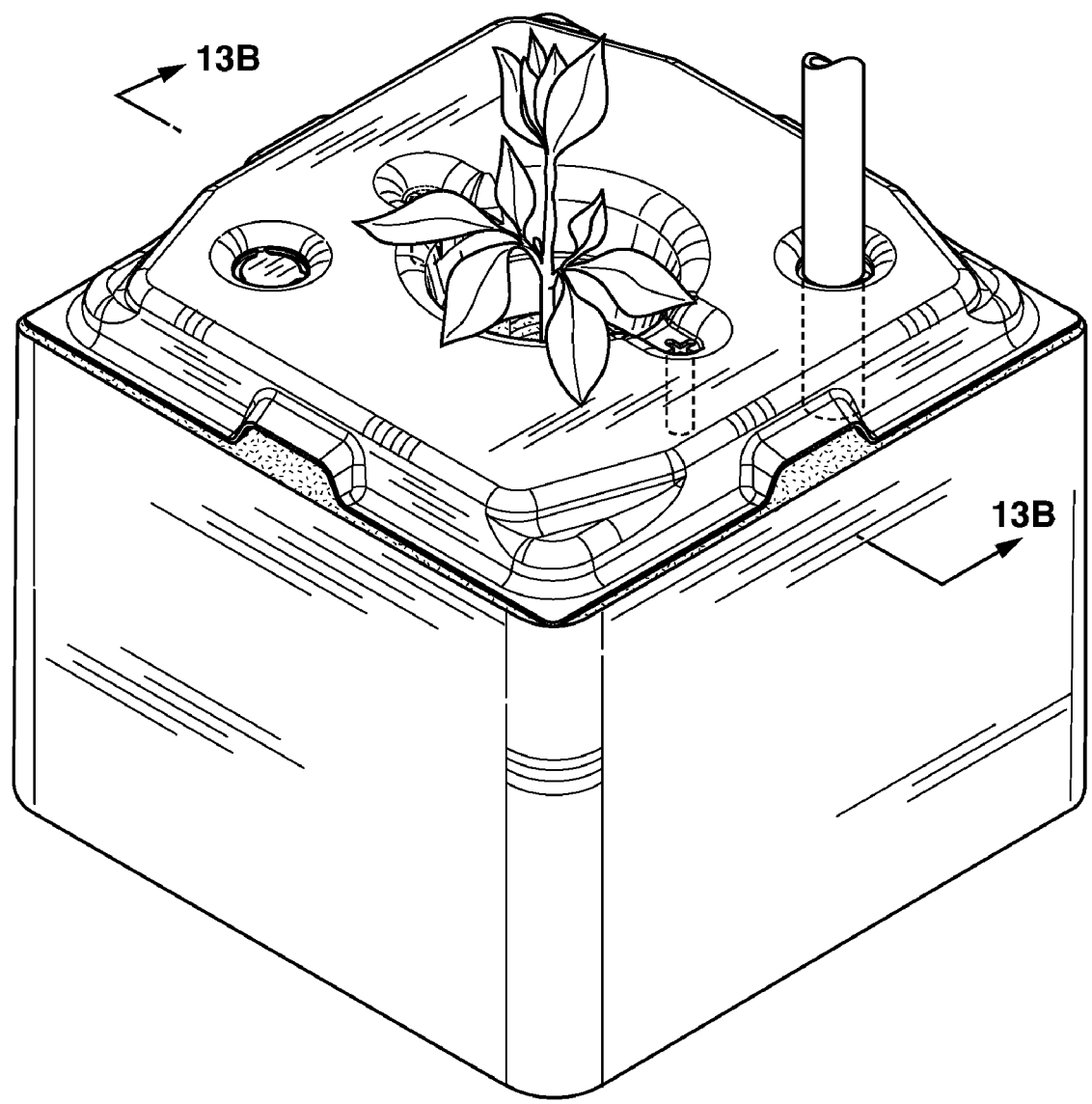
FIG. 12B is a perspective view showing the seedling plug of FIG. 10A disposed in the block of FIG. 12A, with the plant of FIG. 10A at a first stage of growth and extending through the cover of FIG. 1.
Figure 13A:
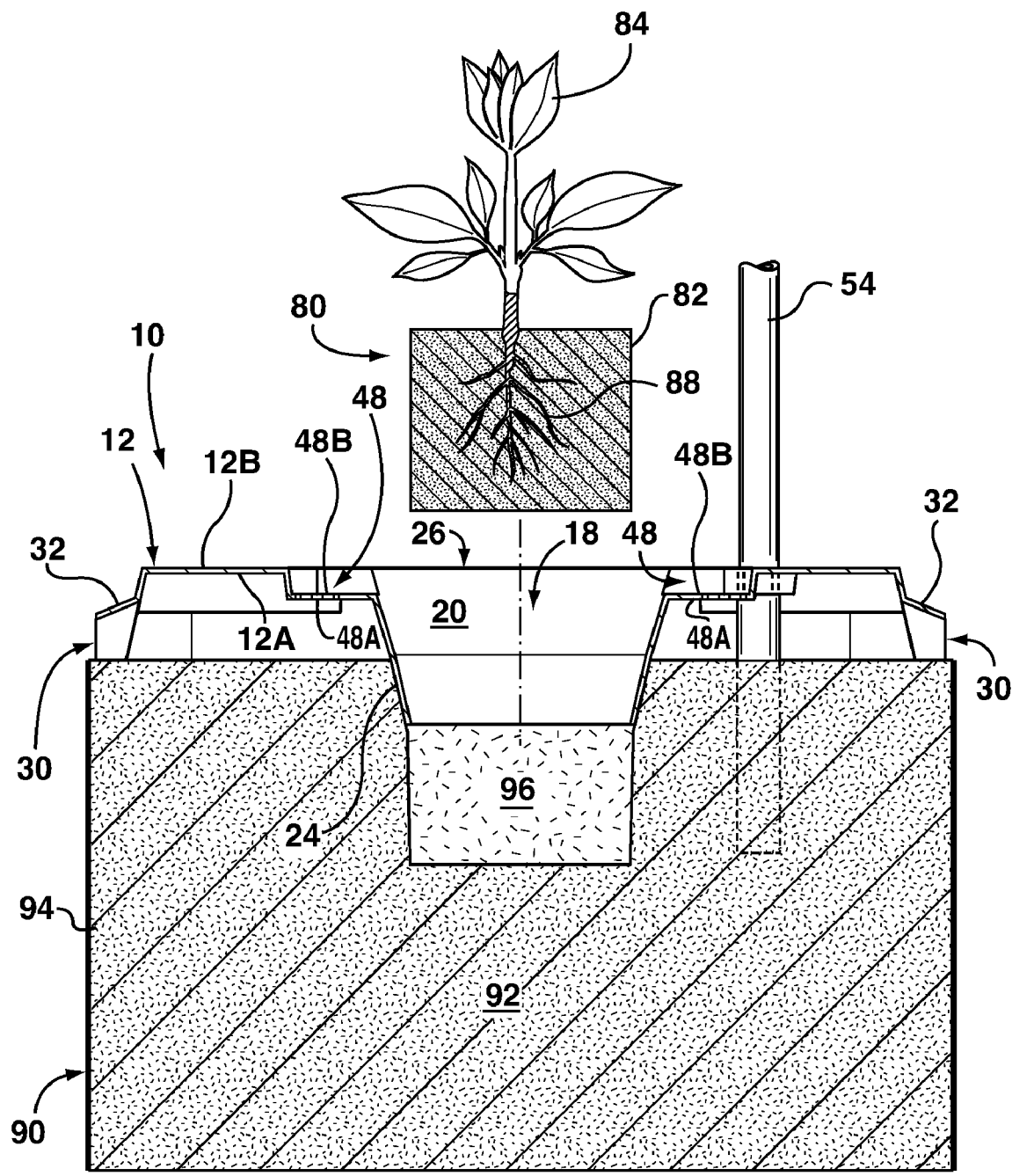
FIG. 13A is a side cross-sectional view, taken along the line 13A-13A in FIG. 12A, showing the seedling plug of FIG. 10A being inserted through the cover of FIG. 1 into the block of FIG. 12A.

FIGS. 12A and 13A show a seedling plug 80, comprising a cylinder of plant-growing medium 82 and a young seedling plant 84, positioned above a formed block 90 of rockwool 92. The outer side surfaces of the block 90 of rockwool 92 are wrapped in a plastic material 94 which is preferably opaque. As best seen in FIG. 13A, the block 90 has a cavity 96 defined at its upper end, and the tube 20 of the first exemplary cover 10 is friction fit into the cavity 96. An irrigation tube 54 passes through the irrigation aperture formed by separating the tab 52 from the main cover portion 12.

Figure 13B:
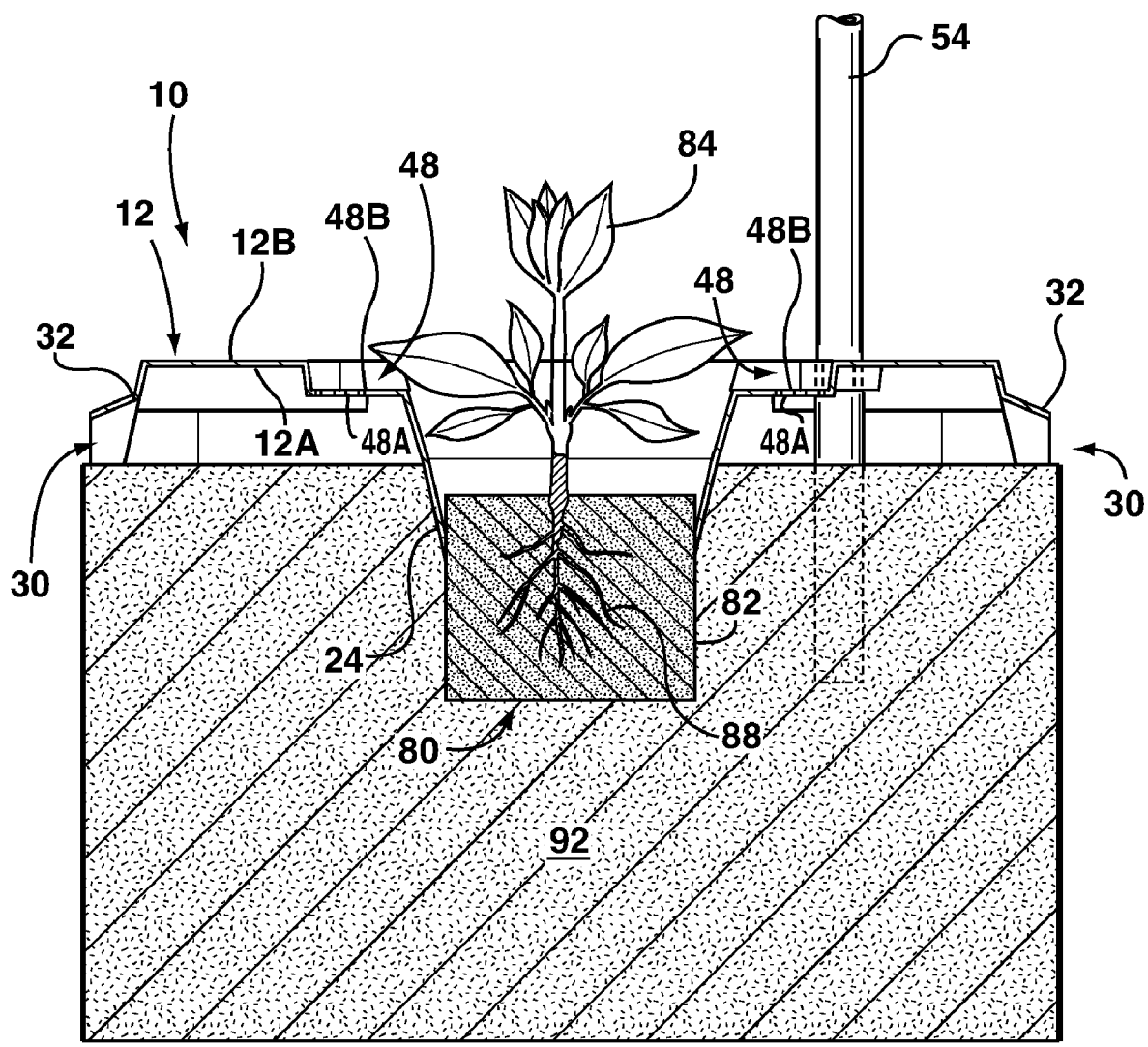
FIG. 13B is a is a side cross-sectional view, taken along the line 13B-13B in FIG. 12B, showing the seedling plug of FIG. 10A disposed in the block of FIG. 12A, with the plant of FIG. 10A at a first stage of growth and extending through the cover of FIG. 1.

The seedling plug 80 is moved downwardly through the first aperture 26 at the proximal end 22 of the tube 20, so that, as shown in FIG. 13B the cylinder of plant-growing medium 82 passes through the tube 20 and into the cavity 96. As noted above, the diameter of the distal end 24 of the tube 20 is slightly smaller than the diameter of the cylinder of plant-growing medium 82, resulting in a friction or interference fit between the cylinder of plant-growing medium 82 and the outer wall of the cavity 96, thereby securing the cover 10 to the block 90 of rockwool 96 with the distal end 24 of the tube 20 sandwiched between the cylinder of plant-growing medium 82 and the outer wall of the cavity 96 in the block 90 of rockwool 96.

Figure 12C:
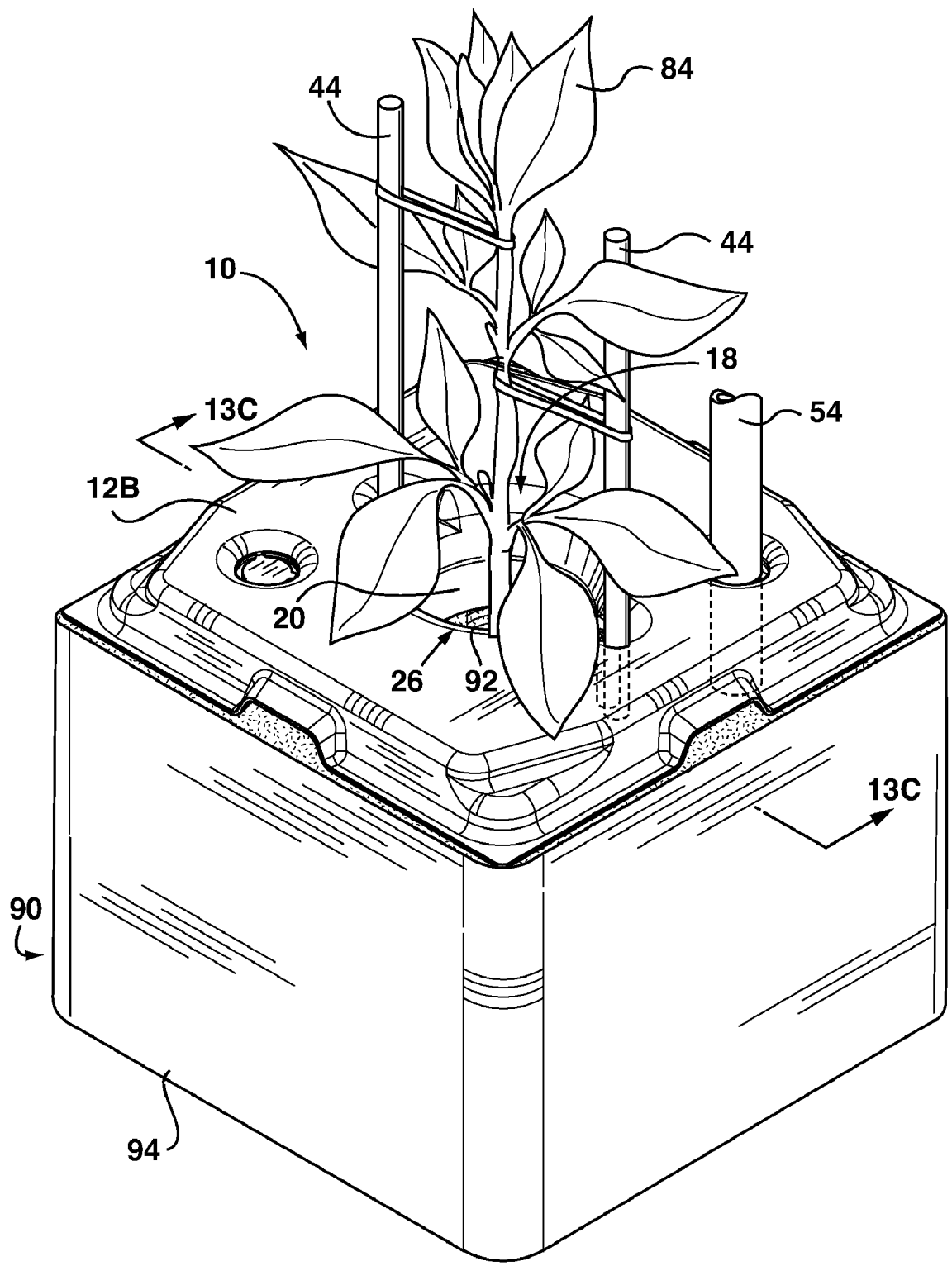
FIG. 12C is a perspective view showing the seedling plug of FIG. 10A disposed in the block of FIG. 12A, with the plant of FIG. 10A at a second stage of growth and extending through the cover of FIG. 1.
Figure 13C:
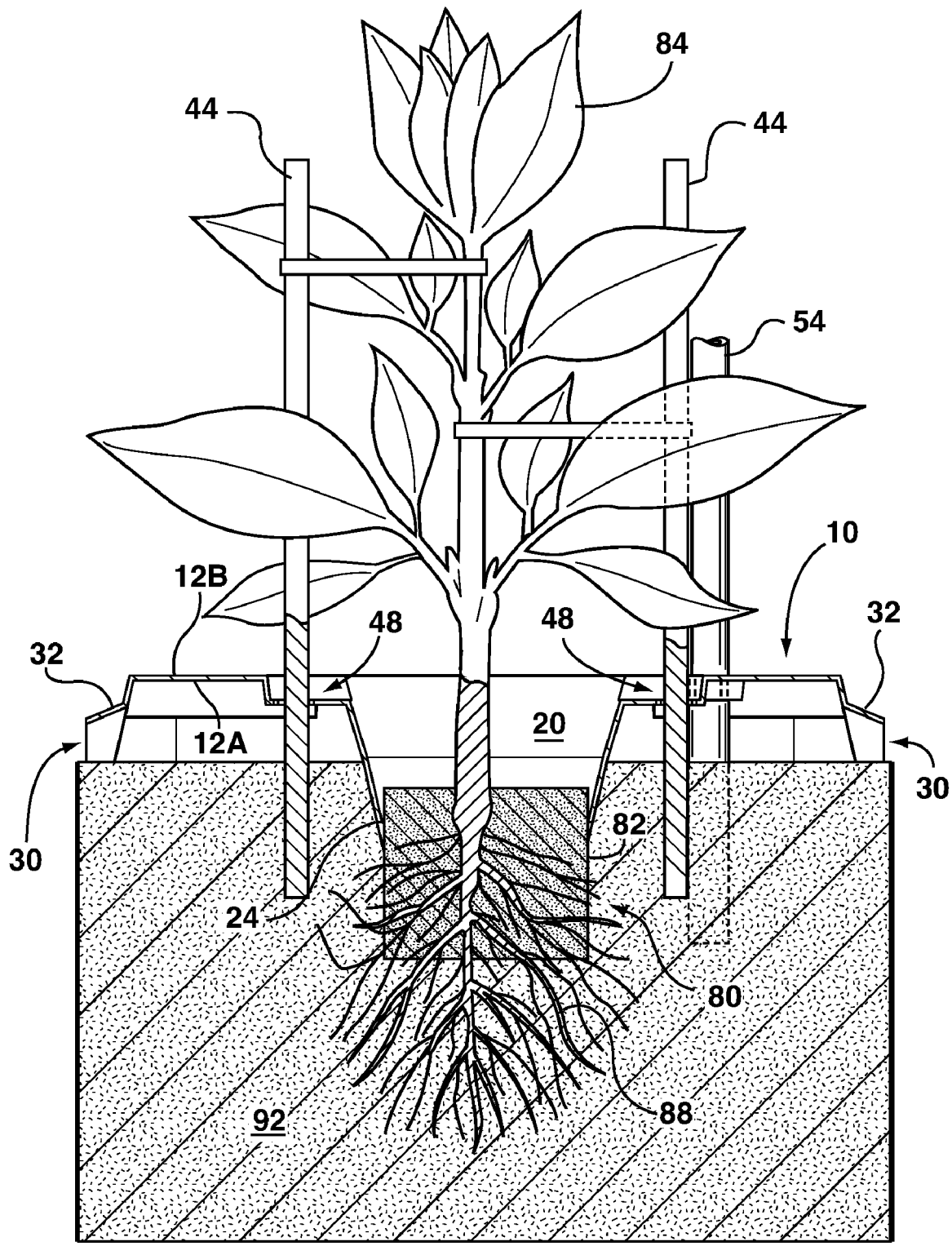
FIG. 13C is a is a side cross-sectional view, taken along the line 13C-13C in FIG. 12C, showing the seedling plug of FIG. 10A disposed in the block of FIG. 12A, with the plant of FIG. 10A at a second stage of growth and extending through the cover of FIG. 1.
Figure 14:
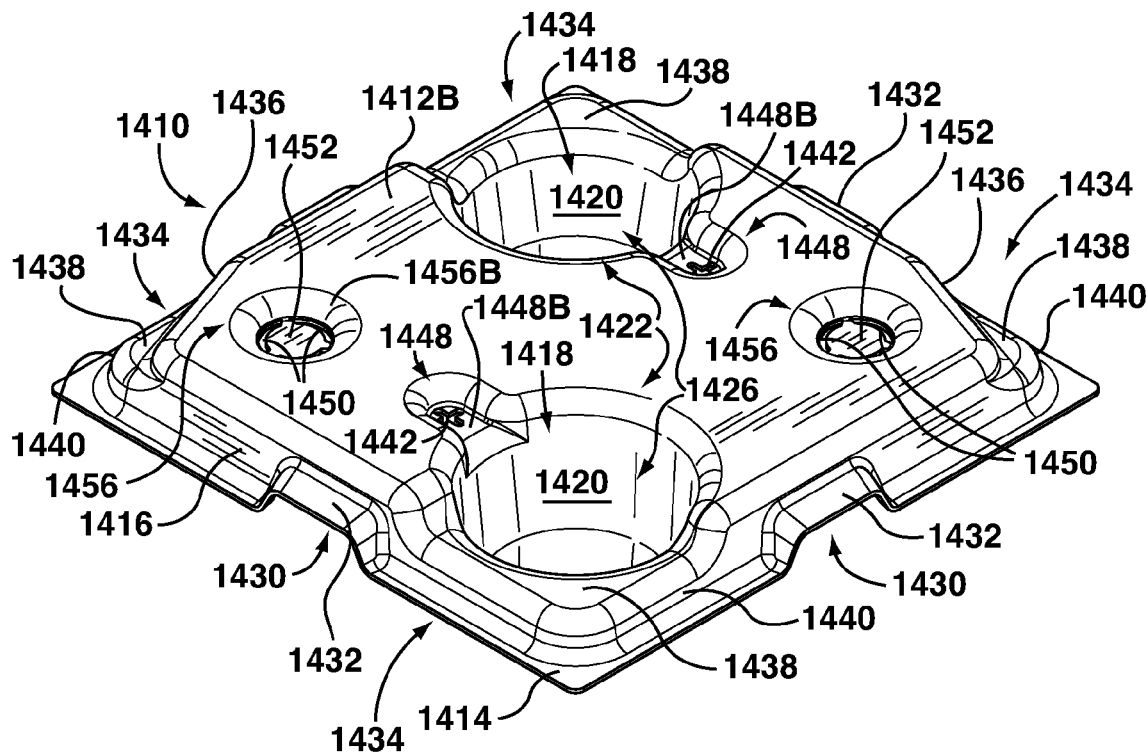
FIG. 14 is a top perspective view of a second embodiment of a cover for a plant-growing medium.
Figure 15:
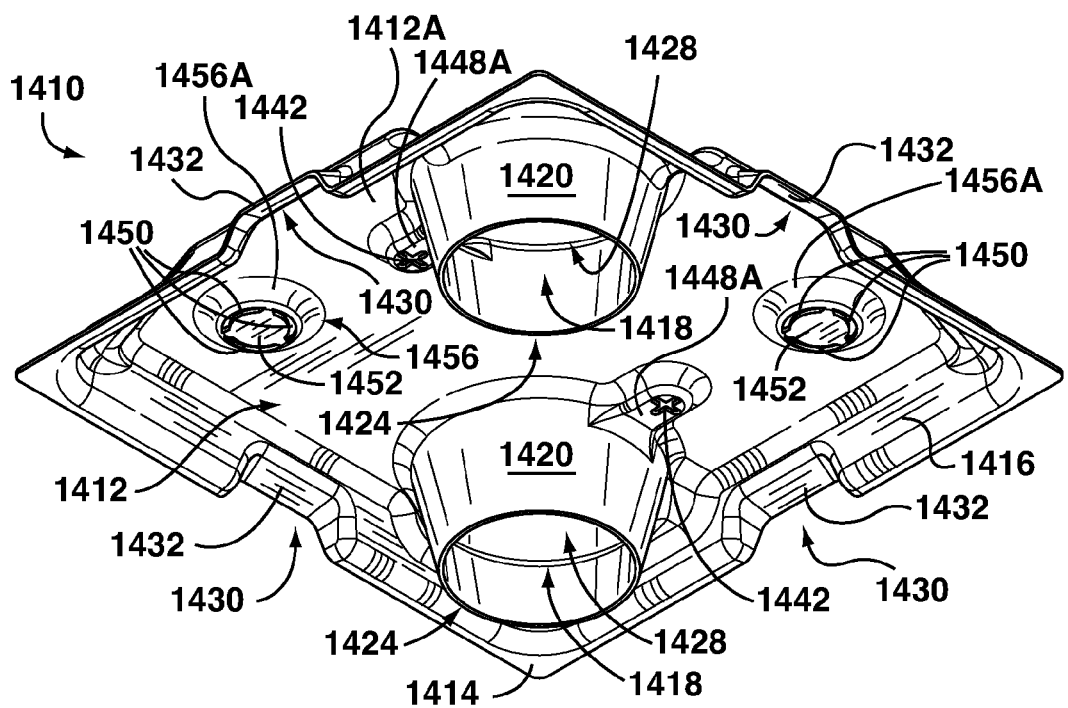
FIG. 15 is a bottom perspective view of the cover of FIG. 14.
Figure 16:
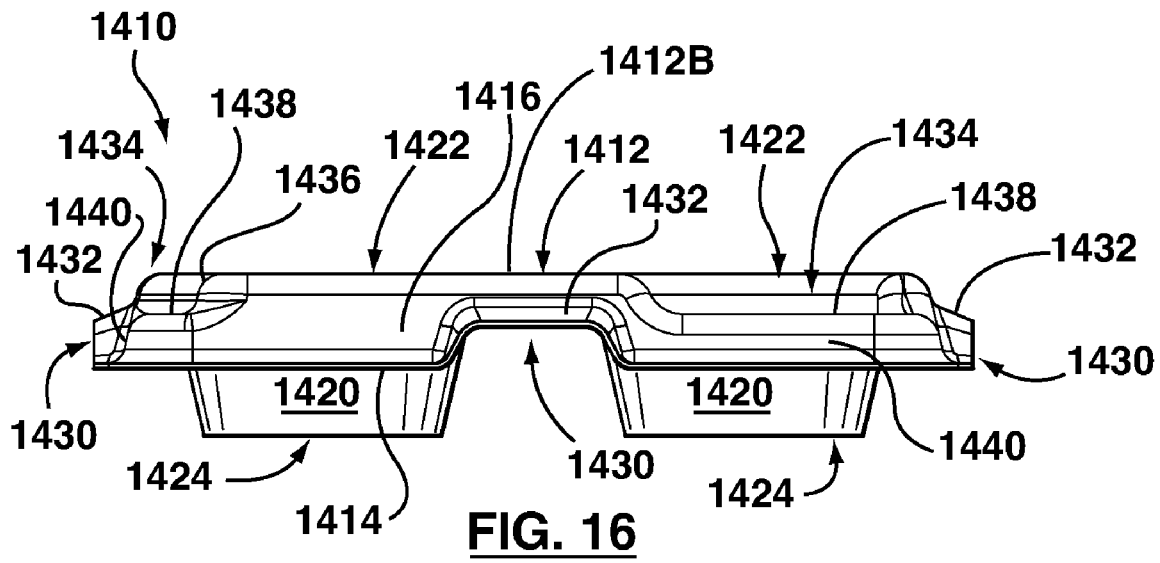
FIG. 16 is a first side view of the cover of FIG. 14.
Figure 17:
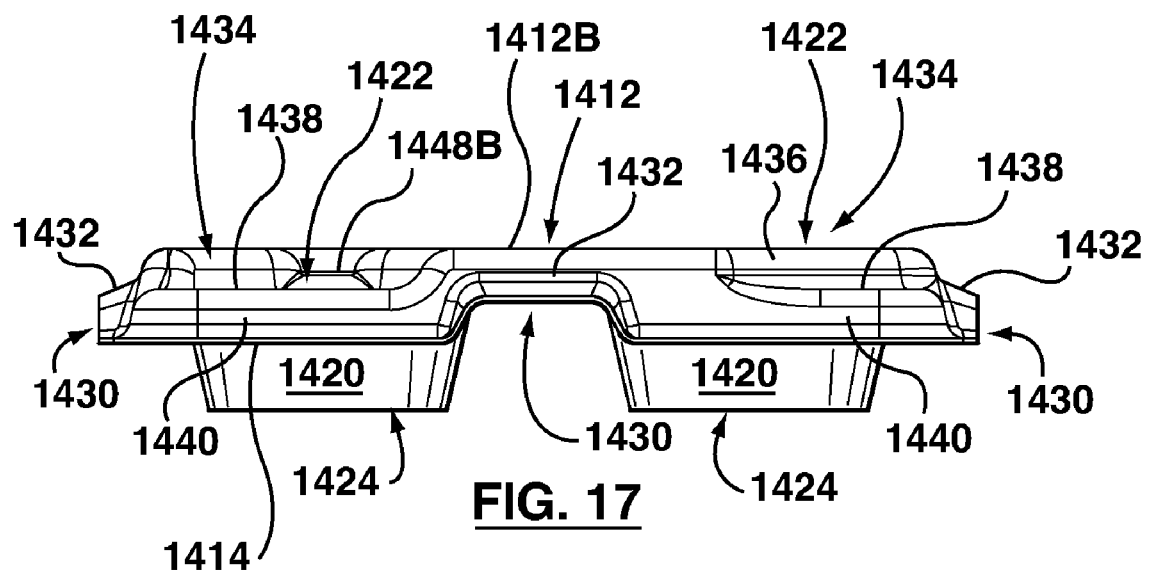
FIG. 17 is a second side view of the cover of FIG. 14.
Figure 18:
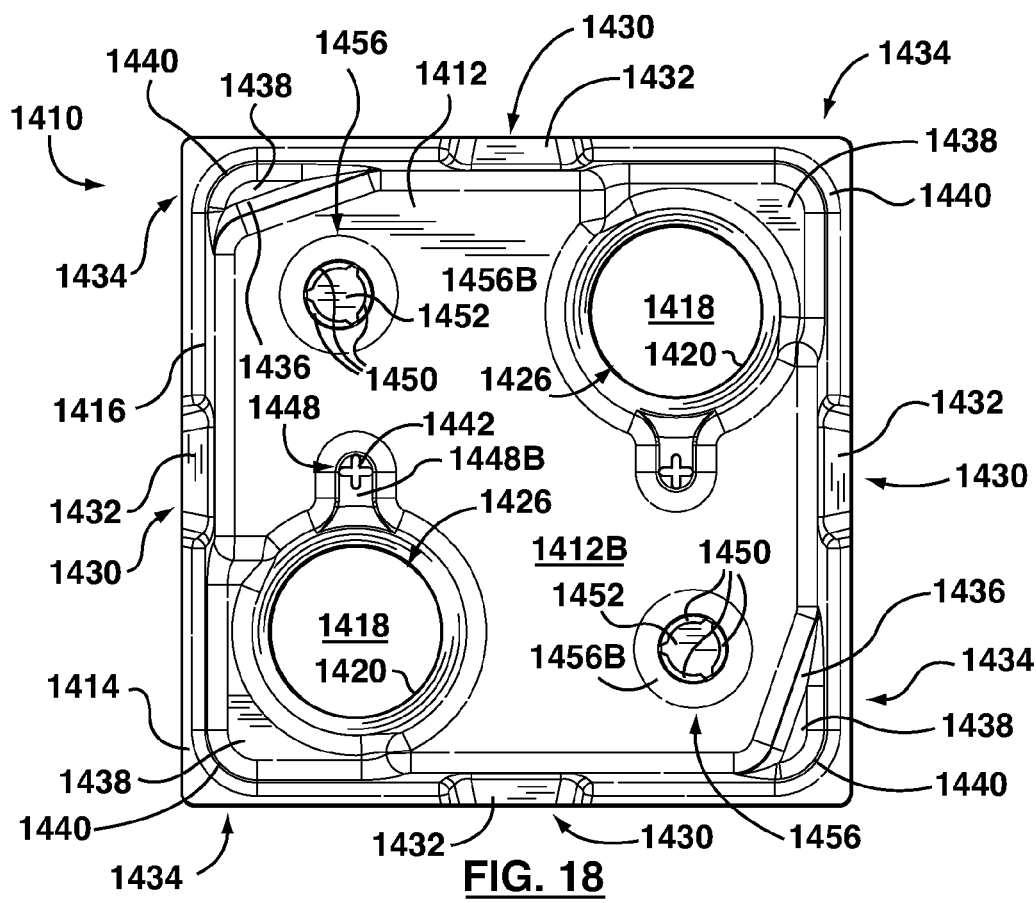
FIG. 18 is a top plan view of the cover of FIG. 14.
Figure 19:
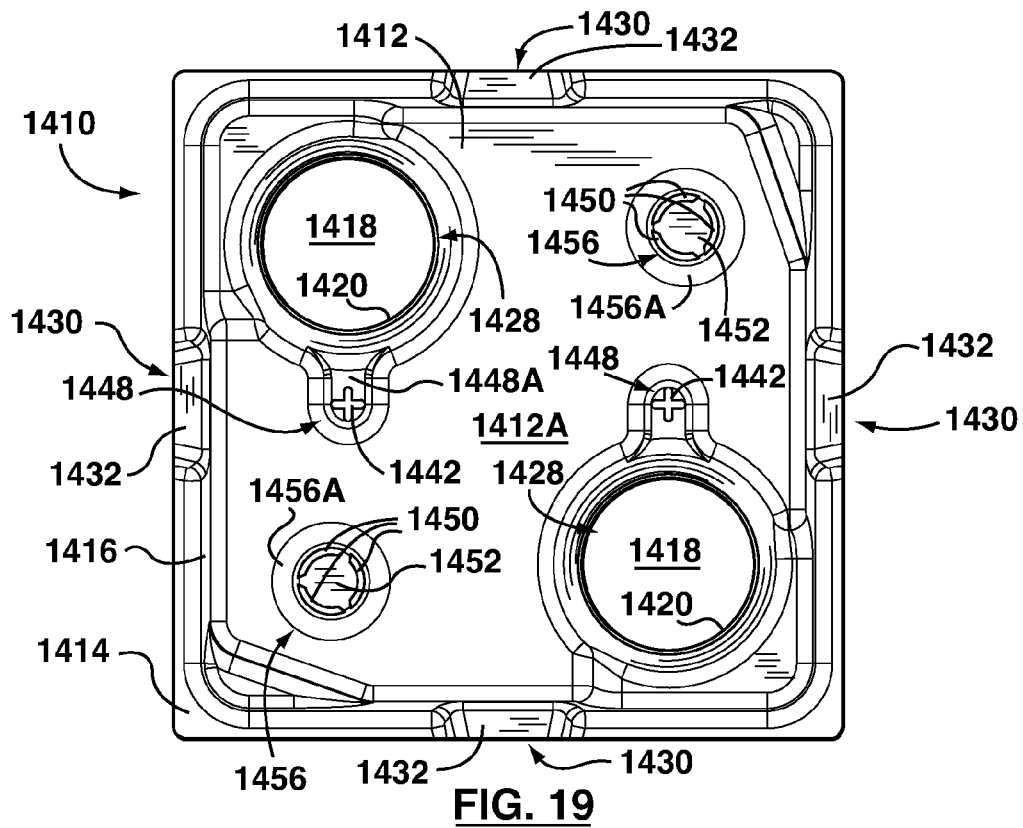
FIG. 19 is a bottom plan view of the cover of FIG. 14.
Figure 20:
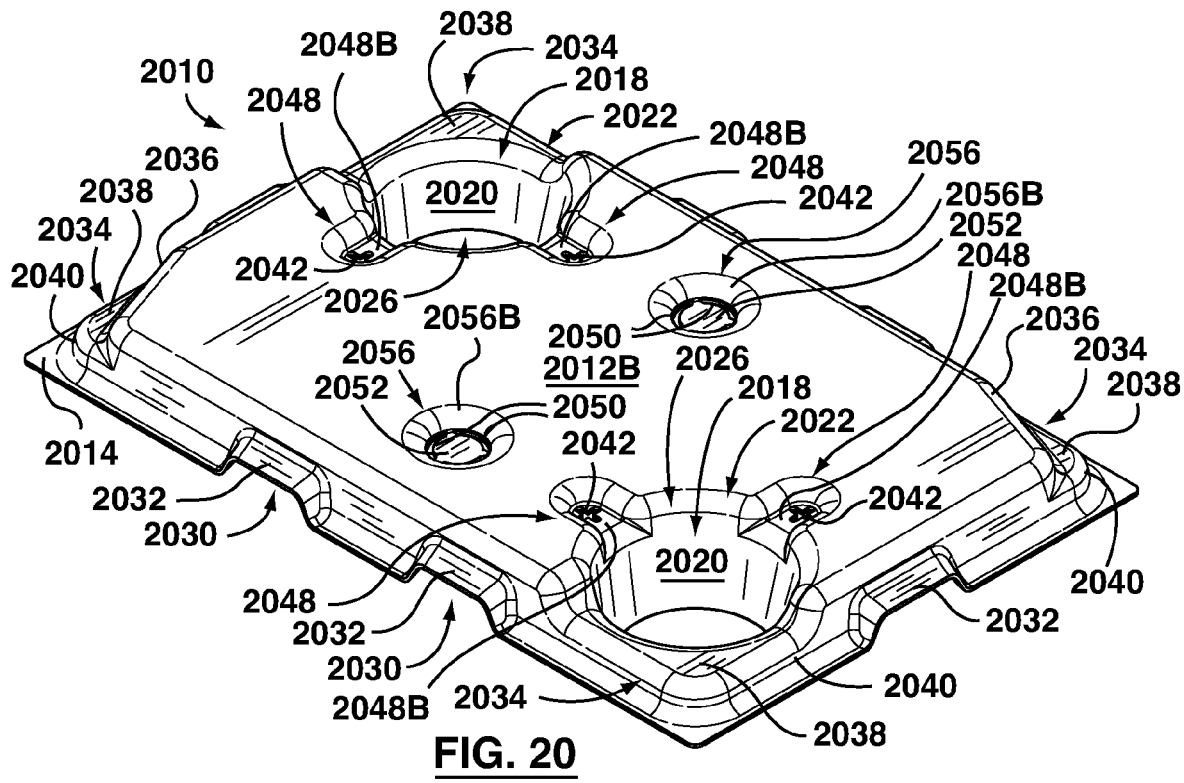
FIG. 20 is a top perspective view of a third embodiment of a cover for a plant-growing medium.
Figure 21:
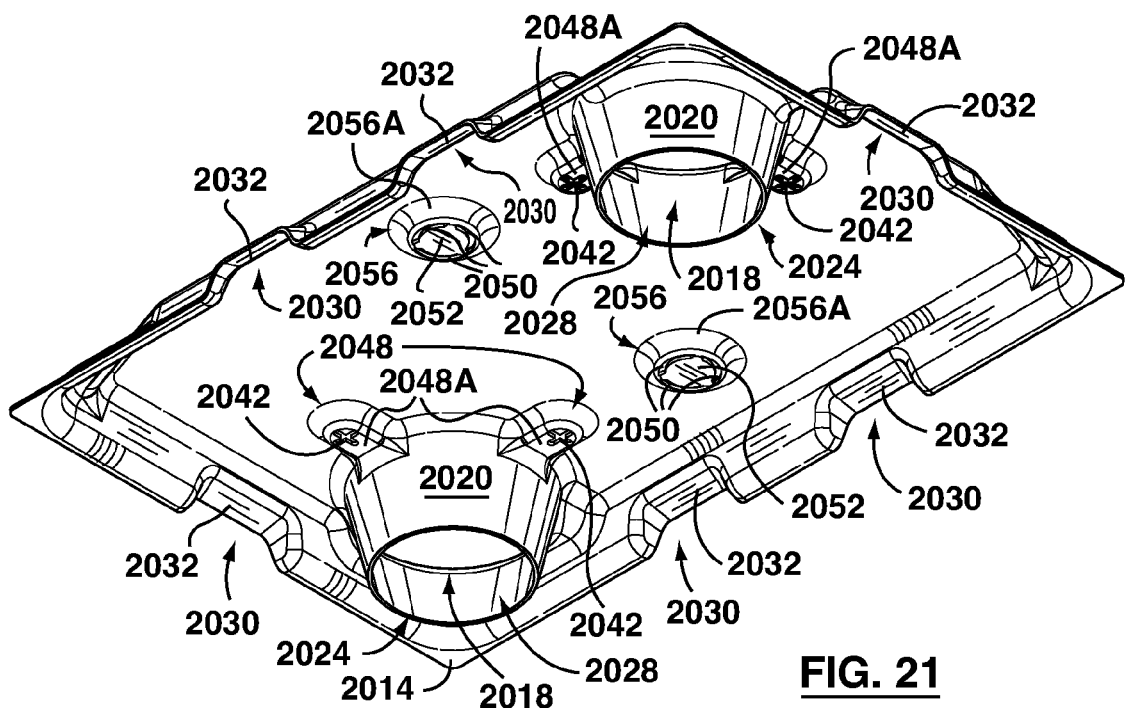
FIG. 21 is a bottom perspective view of the cover of FIG. 20.
Figure 22:
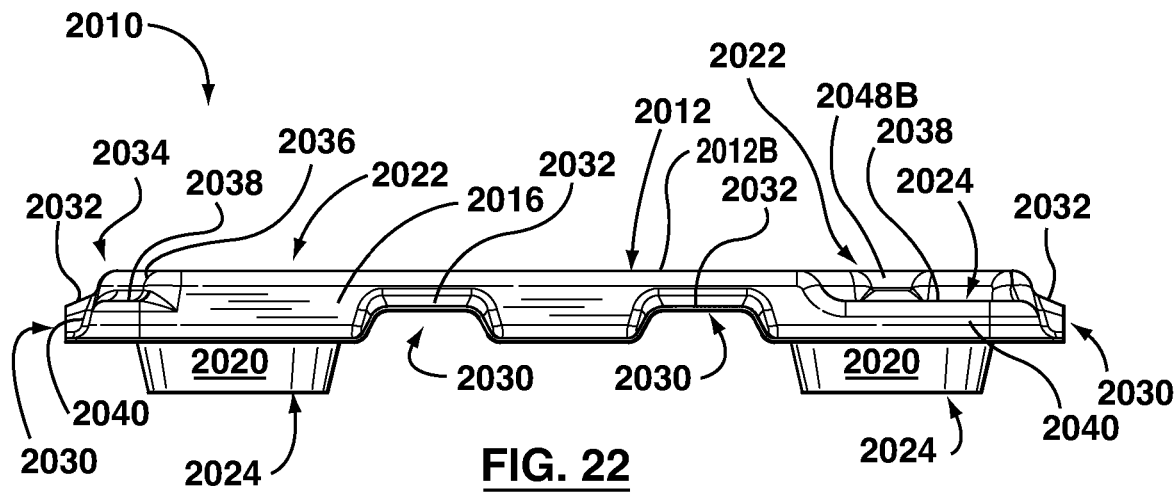
FIG. 22 is a first side view of the cover of FIG. 20.
Figure 23:
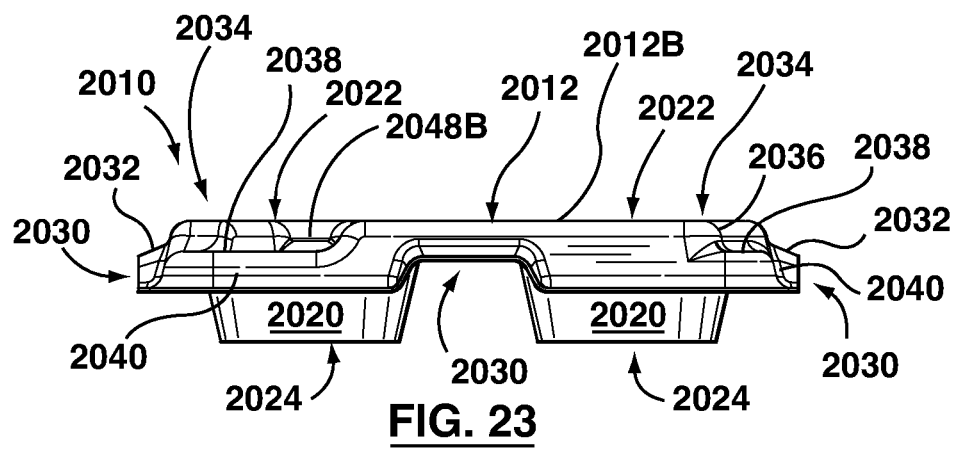
FIG. 23 is a second side view of the cover of FIG. 20.
Figure 26:
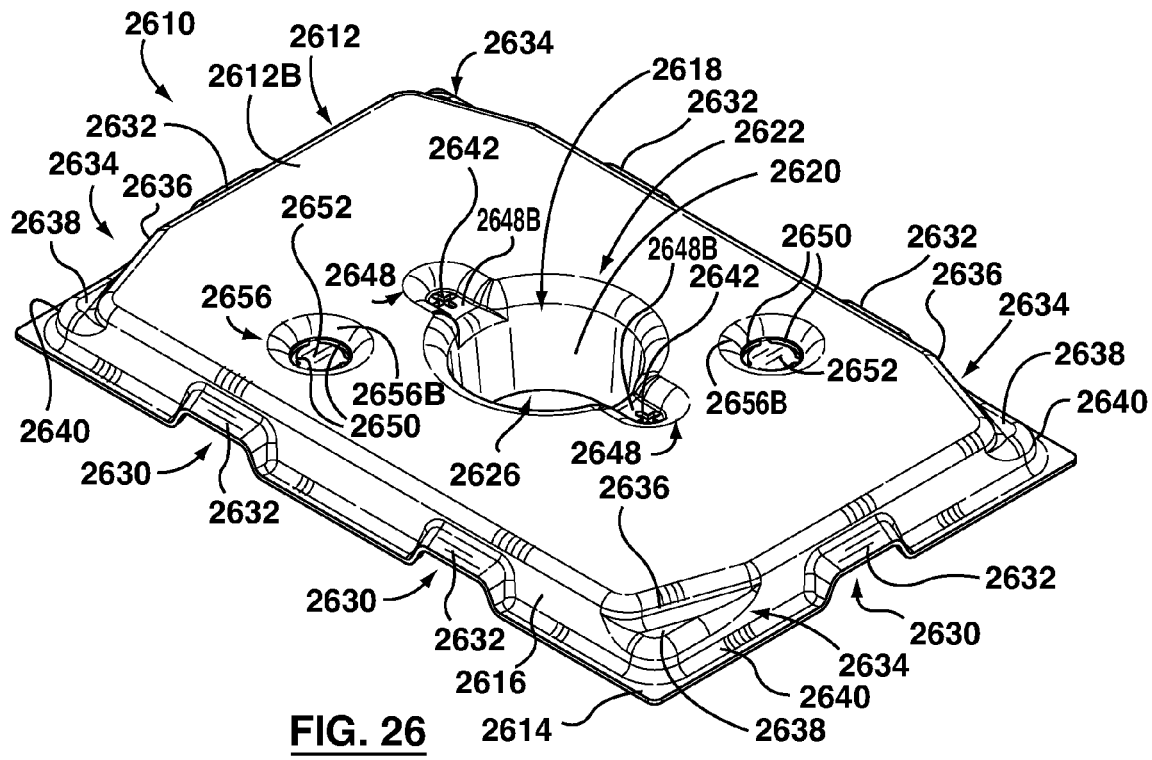
FIG. 26 is a top perspective view of a fourth embodiment of a cover for a plant-growing medium.
Figure 27:
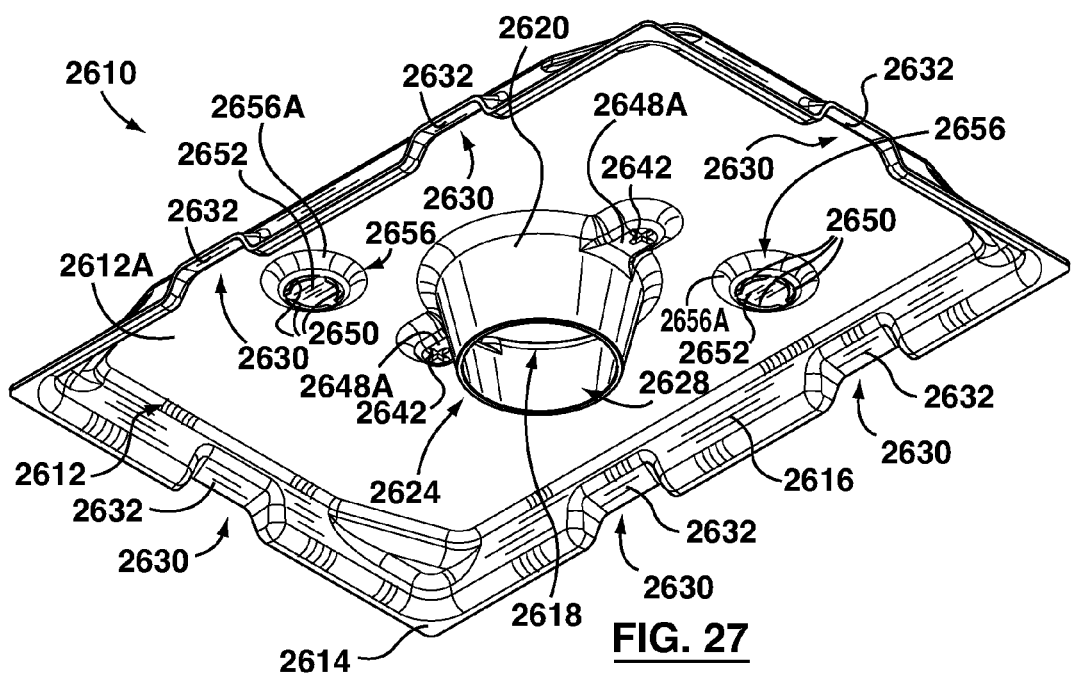
FIG. 27 is a bottom perspective view of the cover of FIG. 26.
Figure 32:
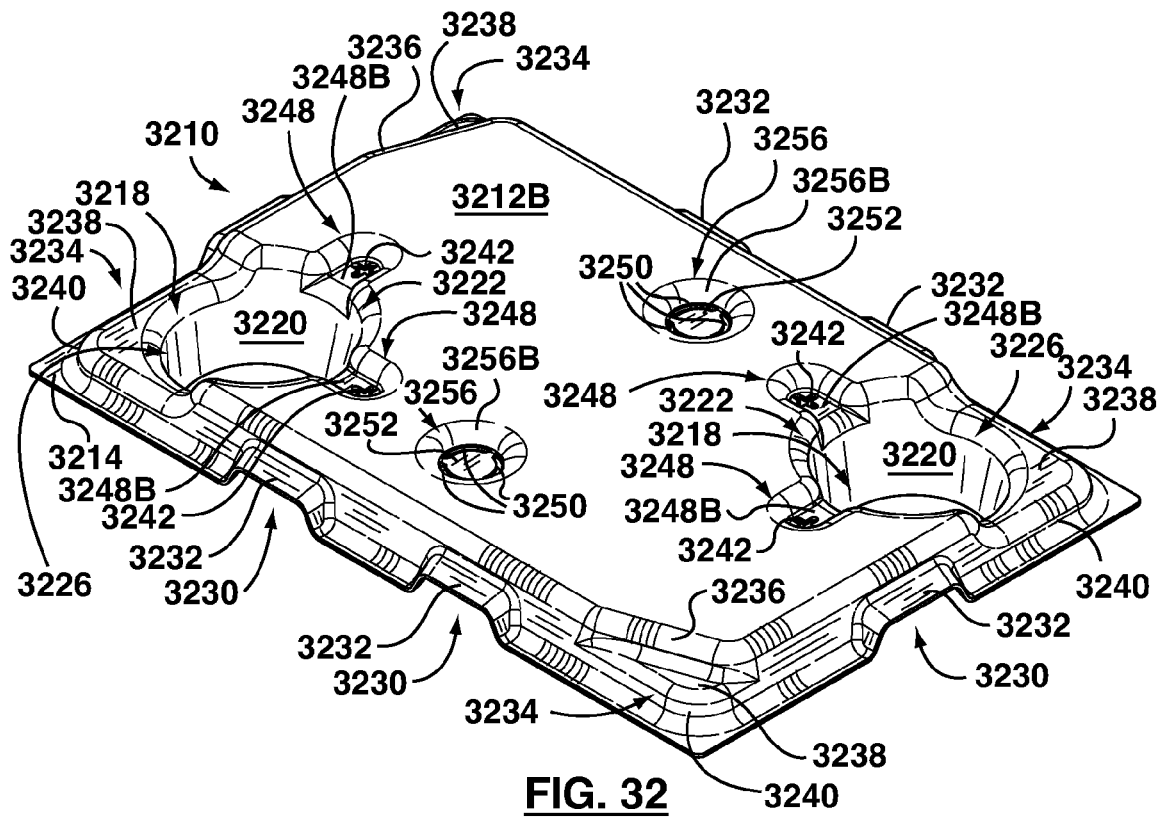
FIG. 32 is a top perspective view of a fifth embodiment of a cover for a plant-growing medium.
Figure 33:
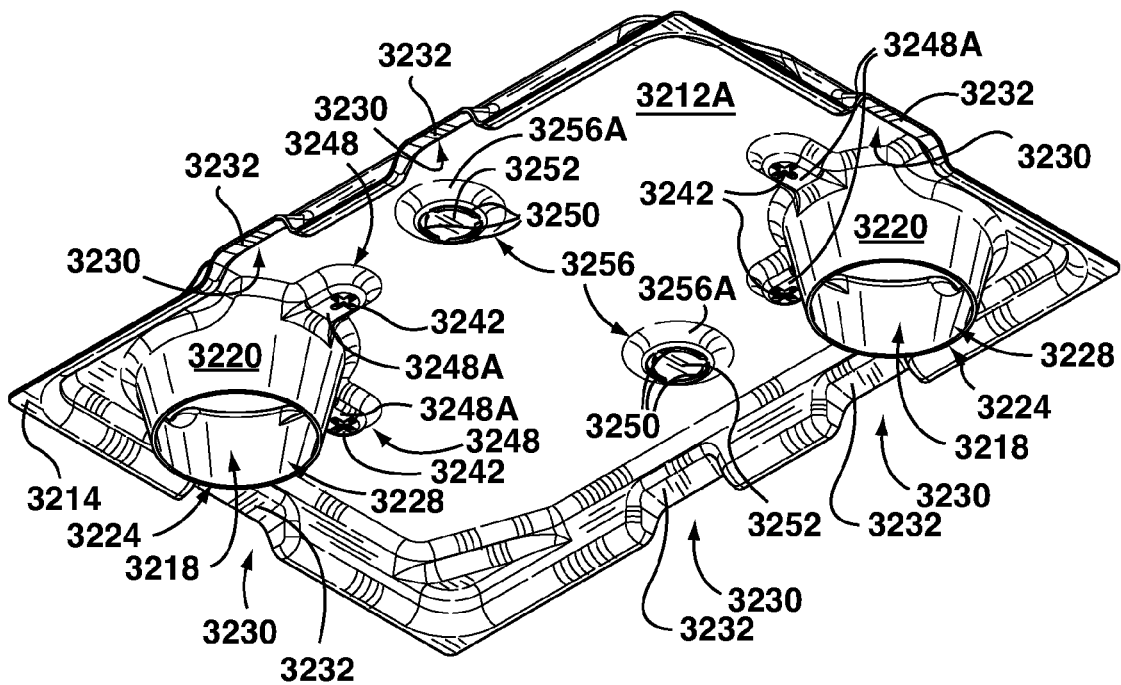
FIG. 33 is a bottom perspective view of the cover of FIG. 32.

Analogously to the situation with the container 60, after the seedling plug 80 has been placed in the block 90 of rockwool 92 (FIGS. 12B and 13B) the seedling plant 84 can continue to grow, with its root structure 88 extending beyond the cylinder of plant-growing medium 82 and into the surrounding rockwool 92 (FIGS. 12C and 13C). As with the arrangement comprising the container 60, plant support members 44 can be inserted into the cruciform receiving slots 42 to support the seedling plant 84 in an upright posture as it grows.

Figure 38:
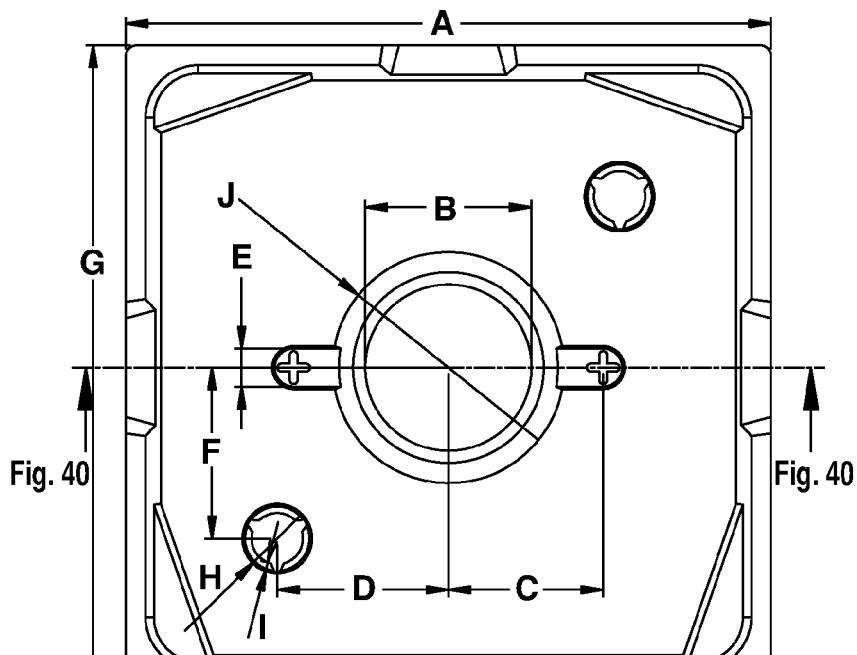
FIGS. 38 to 40 are dimension drawings for an exemplary embodiment of the cover of FIG. 1.
Figure 39:
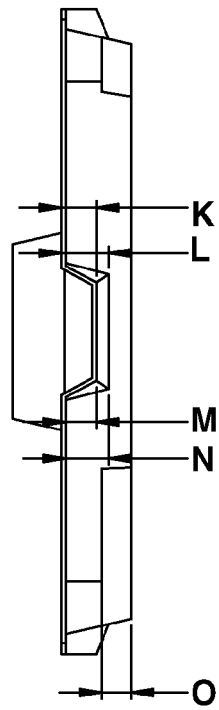
Figure 40:
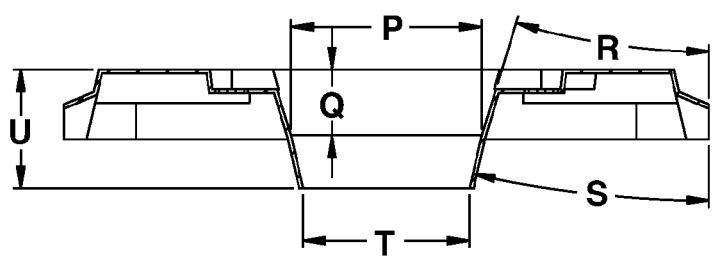

FIGS. 38 to 40 are dimension drawings for the first exemplary embodiment of a cover 10, in which reference letters have been used to denote various dimensions. The chart below sets out the corresponding approximate numerical dimensions of the first exemplary embodiment of a cover 10 according to aspects of the present invention, in millimeters.

| Reference | Dimension (millimeters) |
|---|---|
| A | 98.00 |
| B | 25.27 |
| C | 23.50 |
| D | 26.00 |
| E | 5.80 |
| F | 26.00 |
| G | 98.00 |
| H | 10.00 |
| I | 1.00 |
| J | 35.10 |
| K | 5.30 |
| L | 7.20 |
| M | 4.70 |
| N | 6.60 |
| O | 4.50 |
| P | 28.98 |
| Q | 10.00 |
| R | 17 degrees |
| S | 13 degrees |
| T | 25.27 |
| U | 18.04 |

For illustrative purposes, a detailed description of the construction and use of a first exemplary embodiment of a cover 10 has been provided. Covers according to aspects of the present invention can have a variety of sizes and configurations, and may include a single plant growth channel, or a plurality of plant growth channels. Various other exemplary embodiments of covers according to aspects of the present invention will now be briefly described.

Referring to FIGS. 14 to 19, a second embodiment of a cover for a plant-growing medium is shown generally at 1410. The second embodiment 1410 is generally similar to the first embodiment 10, except that the cover 1410 includes two plant growth channels 1418 positioned inwardly of opposed corners of the cover 1410. Corresponding reference numerals are used to refer to features in the second embodiment of a cover 1410 corresponding to those in the first embodiment 10, except beginning with the prefix "14". Thus, the peripheral base is denoted by 1414, the peripheral wall is denoted by 1416, and so on. The recess regions 1434 located at the two corners where the plant growth channels 1418 are positioned do not include any inwardly recessed proximal portion of the peripheral wall 1416, rather, the intermediate shoulder 1438 of each of these recess regions 1434 extends into the respective plant growth channel 1418, so that at these corners the tubes 1420 open onto the intermediate shoulders 1438. In addition, each plant growth channel 1418 has only a single cruciform receiving slot 1442 disposed adjacent thereto.

FIGS. 41 to 43 are dimension drawings for the second exemplary embodiment of a cover 1410, with reference letters used to denote various dimensions. The chart below sets out the corresponding approximate numerical dimensions of the second exemplary embodiment of a cover 1410, in millimeters.

| Reference | Dimension (millimeters) |
|---|---|
| V | 98.00 |
| W | 92.00 |
| X | 87.38 |
| Y | 36.50 |
| Z | 30.50 |
| AA | 23.50 |
| BB | 5.80 |
| CC | 23.50 |
| DD | 23.50 |
| EE | 28.31 |
| FF | 13.31 |
| GG | 20.00 |
| HH | 15.00 |
| II | 17.45 |
| JJ | 20.84 |
| KK | 26.00 |
| LL | 10.00 |
| MM | 1.00 |
| NN | 26.00 |
| OO | 5.00 |
| PP | 5.00 |
| QQ | 1.20 |
| RR | 87.38 |
| SS | 92.00 |
| TT | 98.00 |
| UU | 18.04 |
| VV | 10.00 |
| WW | 2.40 |
| XX | 30.22 |
| YY | 28.98 |
| ZZ | 10.00 |
| AAA | 25.27 |
| BBB | 3.00 |
| CCC | 4.70 |
| DDD | 6.60 |
| EEE | 4.50 |

With reference now to FIGS. 20 to 25, a third embodiment of a cover for a plant-growing medium is shown generally at 2010. The third embodiment 2010 is generally similar to the second embodiment 2010, except that the outermost edge of the peripheral flange that forms the peripheral base 2014 of the cover 2010 defines an elongate notional rectangle rather than a square notional rectangle, with the third embodiment of a cover 2010 being intended for use with a correspondingly shaped container or block of plant-growing medium. In addition, the elongated sides of the cover 10 have two arch-shaped indentations 2030. Corresponding reference numerals are used to refer to features in the third embodiment of a cover 2010 corresponding to those in the second embodiment 1010, except beginning with the prefix "20". Thus, the peripheral base is denoted by 2014, the peripheral wall is denoted by 2016, and so forth.

Figure 46:
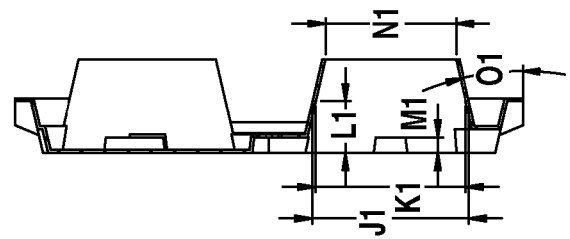
FIGS. 44 to 46 are dimension drawings for an exemplary embodiment of the cover of FIG. 20.
Figure 45:
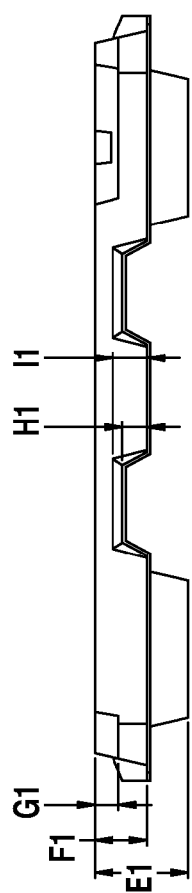
Figure 44:
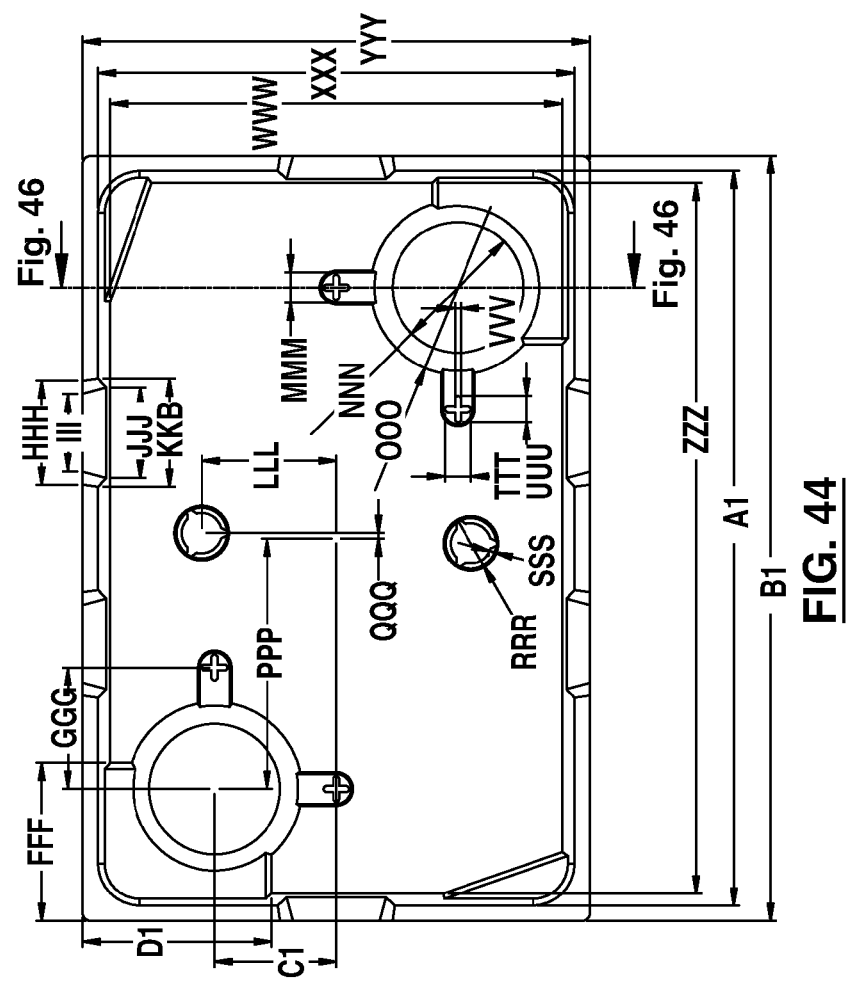

FIGS. 44 to 46 are dimension drawings for the third exemplary embodiment of a cover 2010, with reference letters and numerated reference letters used to denote various dimensions. The chart below sets out the corresponding approximate numerical dimensions of the third exemplary embodiment of a cover 2010, in millimeters.

| Reference | Dimension (millimeters) |
|---|---|
| FFF | 30.50 |
| GGG | 23.50 |
| HHH | 20.00 |
| III | 15.00 |
| JJJ | 17.45 |
| KKB | 20.84 |
| LLL | 26.00 |
| MMM | 5.80 |
| NNN | 25.27 |
| OOO | 33.60 |
| PPP | 48.50 |
| QQQ | 1.00 |
| RRR | 10.00 |
| SSS | 1.00 |
| TTT | 5.00 |
| UUU | 5.00 |
| VVV | 1.20 |
| WWW | 87.38 |
| XXX | 92.00 |
| YYY | 98.00 |
| ZZZ | 137.38 |
| A1 | 142.00 |
| B1 | 148.00 |
| C1 | 23.50 |
| D1 | 36.50 |
| E1 | 18.04 |
| F1 | 10.00 |
| G1 | 4.50 |
| H1 | 4.70 |
| I1 | 6.60 |
| J1 | 30.22 |
| K1 | 28.98 |
| L1 | 10.00 |
| M1 | 3.00 |
| N1 | 25.27 |
| O1 | 13 degrees |

Now referring to FIGS. 26 to 31, a fourth embodiment of a cover for a plant-growing medium is shown generally at 2610. The fourth embodiment 2610 is generally similar to the third embodiment 2010, except that the fourth embodiment of a cover 2610 includes a single, centrally disposed plant growth channel 2618 like the first embodiment of a cover 10, rather than the two plant growth channels 2018 positioned at opposed corners of the third embodiment of a cover 2010. Accordingly, corresponding reference numerals are used to refer to features in the fourth embodiment, except beginning with the prefix "26", so that the peripheral base is denoted by 2614, the peripheral wall is denoted by 2616, and so on.

FIGS. 47 to 50 are dimension drawings for the fourth exemplary embodiment of a cover 2610, with numerated reference letters used to denote various dimensions. The chart below sets out the corresponding approximate numerical dimensions of the fourth exemplary embodiment of a cover 2610, in millimeters.

| Reference | Dimension (millimeters) |
|---|---|
| P1 | 36.58 |
| Q1 | 34.84 |
| R1 | 54.84 |
| S1 | 36.58 |
| T1 | 26.00 |
| U1 | 26.00 |
| V1 | 25.27 |
| W1 | 5.00 |
| X1 | 5.00 |
| Y1 | 6.54 |
| Z1 | 5.80 |
| AA1 | 10.0 |

-continued

| Reference | Dimension (millimeters) |
|---|---|
| BB1 | 10.59 |
| CC1 | 3.90 (radius) |
| DD1 | 23.50 |
| EE1 | 33.60 |
| FF1 | 1.60 (radius) |
| GG1 | 137.38 |
| HH1 | 142.00 |
| II1 | 87.38 |
| JJ1 | 92.00 |
| KK1 | 6.54 |
| LL1 | 3.25 |
| MM1 | 2.40 |
| NN1 | 10.00 |
| OO1 | 30.73 |
| PP1 | 28.98 |
| QQ1 | 18.04 |
| RR1 | 3.00 |
| SS1 | 3.85 |
| TT1 | 10.00 |
| UU1 | 10.85 |
| VV1 | 18.04 |
| WW1 | 25.27 |
| XX1 | 4.63 |
| YY1 | 6.83 |
| ZZ1 | 1.00 |
| AAA1 | 1.96 |
| BBB1 | 1.00 |
| CCC1 | 148.00 |
| DDD1 | 98.00 |

With reference now to FIGS. 32 to 37, a fifth embodiment of a cover for a plant-growing medium is shown generally at 3210. The fifth embodiment 3210 is a mirror image of the third embodiment 2010, and corresponding reference numerals are used to refer to corresponding features, except beginning with the prefix "32".

FIGS. 51 to 54 are dimension drawings for the fifth exemplary embodiment of a cover 3210, with numerated reference letters used to denote various dimensions. The chart below sets out the corresponding approximate numerical dimensions of the fifth exemplary embodiment of a cover 3210, in millimeters.

| Reference | Dimension (millimeters) |
|---|---|
| EEE1 | 148.00 |
| FFF1 | 142.00 |
| GGG1 | 137.38 |
| HHH1 | 40.84 |
| III1 | 20.84 |
| JJJ1 | 5.00 |
| KKB1 | 5.00 |
| LLL1 | 1.20 |
| MMM1 | 5.80 |
| NNN1 | 6.54 |
| OOO1 | 33.60 |
| PPP1 | 97.00 |
| QQQ1 | 25.27 |
| RRR1 | 86.91 |
| SSS1 | 92.00 |
| TTT1 | 98.00 |
| UUU1 | 2.40 |
| VVV1 | 3.00 |
| WWW1 | 3.00 |
| XXX1 | 3.60 |
| YYY1 | 4.65 |
| ZZZ1 | 6.77 |
| A2 | 25.27 |
| B2 | 10.00 |
| C2 | 28.98 |
| D2 | 30.22 |

-continued

| Reference | Dimension (millimeters) |
|---|---|
| E2 | 1.00 |
| F2 | 4.90 (radius) |
| G2 | 10.00 |
| H2 | 10.59 |

Conventional rockwool blocks used in the plant-growing industry are provided with two primary sizes of upper surface, namely 100 millimeters by 100 millimeters and 100 millimeters by 150 millimeters. The exemplary first and second embodiments 10, 1410, whose dimensions are shown in FIGS. 38 to 40 and FIGS. 41 to 43, respectively, may advantageously be used with rockwool blocks having an upper surface measuring 100 millimeters by 100 millimeters. This is shown for the first embodiment 10 in FIGS. 12A to 13C. In this regard, it is to be appreciated that the notional rectangle defined by the outermost edge of the peripheral flange that forms the peripheral base measures 98 millimeters by 98 millimeters for the first and second embodiments, 10, 1410, rather than 100 millimeters by 100 millimeters. This difference in size prevents minor deviations in positioning of the cavity (or cavities) in the rockwool from causing the peripheral flange to protrude past the upper surface of the rockwool block, which could interfere with automated handling.

Similarly, the exemplary third, fourth and fifth embodiments 2010, 2610, 3210, whose dimensions are shown in FIGS. 44 to 46, FIGS. 47 to 50 and FIGS. 51 to 54, respectively, may advantageously be used with rockwool blocks having an upper surface measuring 100 millimeters by 150 millimeters. Again it is to be noted that the notional rectangle defined by the outermost edge of the peripheral flange that forms the peripheral base measures 98 millimeters by 148 millimeters for the third, fourth and fifth embodiments, rather than 100 millimeters by 150 millimeters, to accommodate minor deviations in cavity position without causing the peripheral flange to extend past the edge of the rockwool block.

Selection of the appropriate cover will depend on the size of the rockwool block, as well as the number and placement of the cavities in the rockwool block. Additionally, the first and second embodiments may also be used with correspondingly sized containers, such as the container 60 described above, whose peripheral flange 64 defines a notional rectangle measuring 98 millimeters by 98 millimeters, and the third, fourth and fifth embodiments can be used with a similar container having a peripheral flange measuring 98 millimeters by 148 millimeters.

It will be appreciated that the dimensions set out in the tables above represent the mold dimensions, and hence are representative of covers molded perfectly, without shrinkage. Actual covers will have slight variances from these dimensions. In addition, the dimensions set out in the tables above and accompanying FIGS. 38 to 54 represent particular preferred embodiments, and covers having other dimensions are also contemplated.

Preferably, covers according to aspects of the present invention are made from an opaque material, so as to obstruct light from reaching plant-growing medium in the container, or the block of rockwool, and thereby inhibit the growth of algae therein, since algae requires light. Also preferably, covers according to aspects of the present invention are integrally formed by molding the covers from a biodegradable material. One suitable biodegradable material is bagasse, which is the fibrous residue left over after crushing sugar cane or sorghum stalks. Containers, such as the container 60 shown in FIGS. 7 to 11C, may be made from the same material. Other suitable materials may also be used to make covers according to aspects of the present invention.

In the illustrated embodiments the main cover portions are generally planar, in other embodiments the main cover portions may have other configurations.

One or more currently preferred embodiments have been described by way of example. It will be apparent to persons skilled in the art that a number of variations and modifications can be made without departing from the scope of the invention as defined in the claims.

What is claimed is:

1. A plant growth assembly comprising:
a cover comprising:
a main cover portion;
a peripheral base spaced from the main cover portion and defining an outer perimeter of the cover;
a peripheral wall extending from a first side of the main cover portion between the main cover portion and the peripheral base;
at least one plant growth channel defined by a tube extending from the first side of the main cover portion, wherein for each plant growth channel:
the tube has a proximal end adjacent the main cover portion and a distal end relative to the proximal end;
a first aperture is defined in the main cover portion at the proximal end of the tube and a second aperture is defined at the distal end of the tube, the first aperture and the second aperture communicating through the tube;
a quantity of plant-growing medium disposed opposite the first side of the main cover portion; and
a plant, the plant extending from the plant growth medium into the distal end of the tube, through the plant growth channel and past the proximal end of the tube; wherein:
for each plant growth channel, the tube extends past the peripheral base; the peripheral base comprises an outwardly extending peripheral flange located at a distal end of the peripheral wall, relative to the main cover potion; an outermost edge of the peripheral flange defines a notional rectangle; and for each edge of the notional rectangle defined by the outermost edge of the peripheral flange, at least one arch-shaped indentation is defined in a distal portion of the peripheral wall that is distal from the main cover portion.

2. The plant growth assembly of claim 1, wherein the main cover portion is generally planar.

3. The plant growth assembly of claim 1, wherein for each plant growth channel, the first aperture is larger than the second aperture and the tube is generally frusto-conical and tapers from the first aperture to the second aperture.

4. The plant growth assembly of claim 3, wherein the main cover portion has at least one receiving slot defined therethrough adjacent each plant growth channel, each receiving slot able to receive a plant support member and retain the plant support member so that the plant support member extends from the second side of the main cover portion, generally perpendicularly thereto.

5. The plant growth assembly of claim 4, wherein each receiving slot is cruciform.

6. The plant growth assembly of claim 5, wherein each receiving slot is located in a plant support area of the main cover portion defined by a plant support projection on the first side of the main cover portion and a corresponding plant support depression on the second side of the main cover portion.

7. The plant growth assembly of claim 3, wherein the main cover portion has at least one set of perforations therethrough, each set of perforations defining a removable tab, whereby removal of the tab defines an irrigation aperture for receiving an irrigation tube.

8. The plant growth assembly of claim 7, wherein each set of perforations is located in an irrigation area of the main cover portion defined by an irrigation projection on the first side of the main cover portion and a corresponding irrigation depression on the second side of the main cover portion.

9. The plant growth assembly of claim 1, wherein the peripheral wall includes recess regions where a proximal portion of the peripheral wall adjacent the main cover portion is recessed inwardly to define an intermediate shoulder between the proximal portion of the peripheral wall and the distal portion of the peripheral wall.

10. The plant growth assembly of claim 9, wherein the recess regions are located adjacent corners of the notional rectangle defined by the outermost edge of the peripheral flange.

11. The plant growth assembly of claim 1, wherein the cover is integrally formed.

12. The plant growth assembly of claim 1, wherein the cover is formed from biodegradable material.

13. The plant growth assembly of claim 12, wherein the biodegradable material comprises bagasse.

14. The plant growth assembly of claim 1, wherein:
the plant-growing medium is loose particulate disposed in a container.

15. The plant growth assembly of claim 14, wherein:
the container has a peripheral flange corresponding in size and shape to the peripheral base of the cover; and
the cover is secured to the container by mating between the peripheral flange and the peripheral base.

16. The plant growth assembly of claim 1, wherein the plant-growing medium is a block of rockwool.

* * * * *

UNITED STATES PATENT AND TRADEMARK OFFICE
CERTIFICATE OF CORRECTION

PATENT NO. : 8,365,465 B2
APPLICATION NO. : 12/625350
DATED : February 5, 2013
INVENTOR(S) : James Barrie Ogilvie It is certified that error appears in the above-identified patent and that said Letters Patent is hereby corrected as shown below:

In the Claims:

in claim 1, column 12, line 44, "potion" should be replaced by "portion"

Signed and Sealed this
Twenty-eighth Day of May, 2013

Teresa Stanek Rea
*Acting Director of the United States Patent and Trademark Office*